United States Patent
Nakagata

(10) Patent No.: US 10,609,458 B2
(45) Date of Patent: Mar. 31, 2020

(54) APPARATUS FOR EMBEDDING DIGITAL WATERMARK AND METHOD FOR EMBEDDING DIGITAL WATERMARK

(71) Applicant: FUJITSU LIMITED, Kawasaki-shi, Kanagawa (JP)

(72) Inventor: Shohei Nakagata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 15/695,105

(22) Filed: Sep. 5, 2017

(65) Prior Publication Data

US 2018/0091871 A1   Mar. 29, 2018

(30) Foreign Application Priority Data

Sep. 29, 2016   (JP) ................. 2016-191220

(51) Int. Cl.
   *H04N 21/8358*   (2011.01)
   *G06T 1/00*   (2006.01)
   *H04N 21/234*   (2011.01)

(52) U.S. Cl.
   CPC ....... *H04N 21/8358* (2013.01); *G06T 1/0028* (2013.01); *G06T 1/0085* (2013.01); *H04N 21/23418* (2013.01); *G06T 2201/0051* (2013.01); *G06T 2201/0065* (2013.01)

(58) Field of Classification Search
   CPC ............. H04N 19/467; H04N 21/8358; H04N 21/23418; G06T 1/0085; G06T 1/0028; G06T 2201/0065; G06T 2201/0051
   See application file for complete search history.

(56) References Cited

U.S. PATENT DOCUMENTS

| | | | | |
|---|---|---|---|---|
| 6,373,960 B1* | 4/2002 | Conover | ............... | G06T 1/0035 348/412.1 |
| 6,671,387 B1* | 12/2003 | Chen | .................... | G06T 1/0028 382/100 |
| 8,385,590 B1* | 2/2013 | Moorer | ............. | H04N 21/8358 382/100 |
| 2002/0076086 A1 | 6/2002 | Yoshiura et al. | | |
| 2002/0181706 A1* | 12/2002 | Matsumura | .......... | H04N 19/137 380/205 |
| 2004/0250079 A1* | 12/2004 | Kalker | ................. | G06T 1/0064 713/176 |

(Continued)

FOREIGN PATENT DOCUMENTS

| | | |
|---|---|---|
| JP | 2001-61055 A | 3/2001 |
| JP | 2004-341066 A | 12/2004 |
| JP | 2010-258585 A | 11/2010 |

*Primary Examiner* — Christopher C Harris
(74) *Attorney, Agent, or Firm* — Westerman, Hattori, Daniels & Adrian, LLP

(57) ABSTRACT

An apparatus for embedding a digital watermark includes a memory, and a processor coupled to the memory and configured to generate a watermark signal to be embedded into moving image data based on information to be added to the moving image data, determine a frame of the moving image data at which overlapping of the watermark signal is to be started based on a variation in value in a time direction of a pixel in a region, in each of a plurality of frames of the moving image data, into which the watermark signal is to be embedded and also on a feature of the watermark signal, and embed the watermark signal beginning with the determined frame.

15 Claims, 22 Drawing Sheets

(56) References Cited

U.S. PATENT DOCUMENTS

| | | | | |
|---|---|---|---|---|
| 2011/0228972 A1* | 9/2011 | Nakamura | ............ | G06T 1/0085 382/100 |
| 2012/0163653 A1* | 6/2012 | Anan | .................. | H04N 19/467 382/100 |
| 2013/0259294 A1* | 10/2013 | Mehta | .................. | G06T 1/0028 382/100 |
| 2014/0016817 A1* | 1/2014 | Nakagata | ............ | H04N 19/467 382/100 |
| 2015/0324948 A1* | 11/2015 | Cain | .................... | G06T 1/0092 382/100 |
| 2016/0071229 A1* | 3/2016 | Beaubien | ............. | G06T 1/0028 382/100 |

* cited by examiner

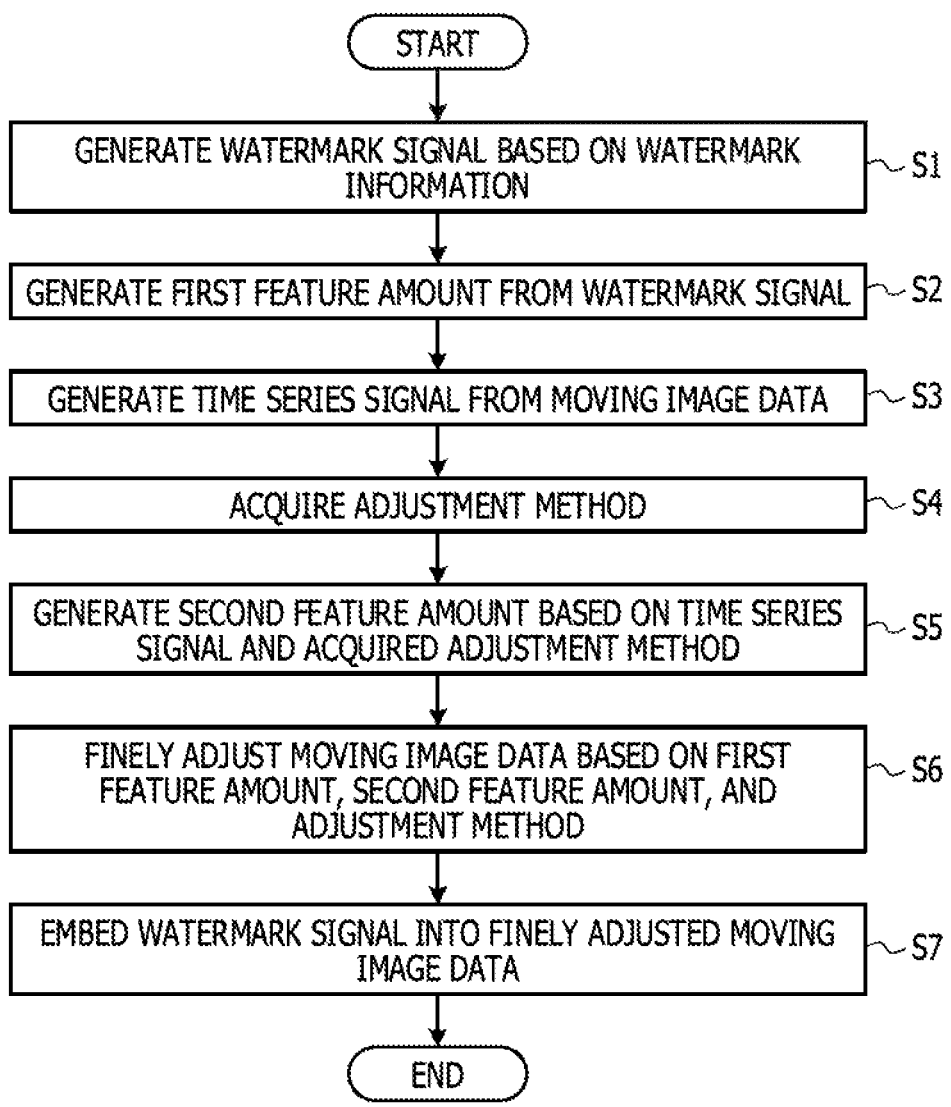

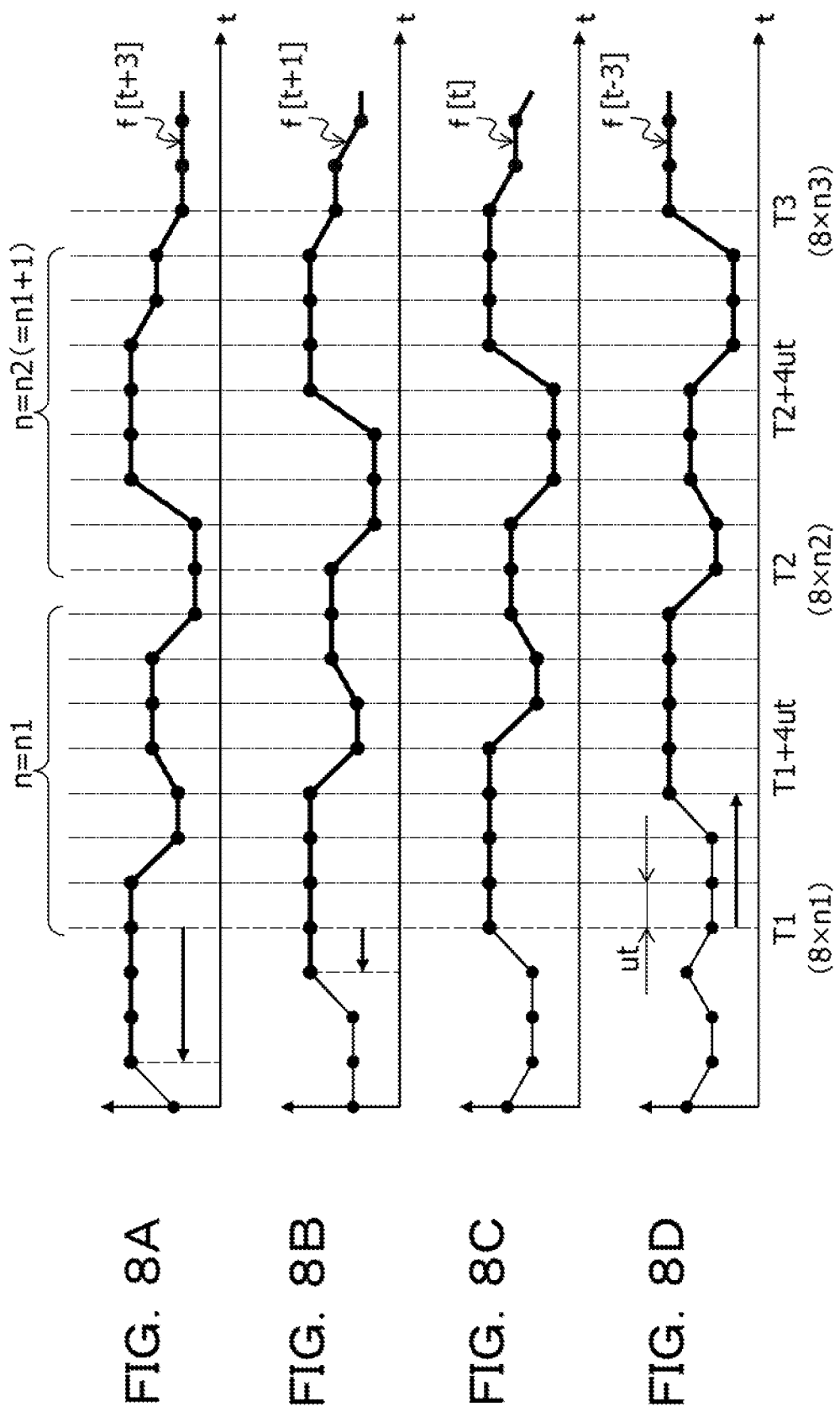

FIG. 11

| TIME SERIES SIGNAL | SECTION | | |
|---|---|---|---|
| | n1 | n2 | ... |
| f[t+3] | $rf_0[n1, -3]$, $rf_1[n1, -3]$ | $rf_0[n2, -3]$, $rf_1[n2, -3]$ | ... |
| f[t+2] | $rf_0[n1, -2]$, $rf_1[n1, -2]$ | $rf_0[n2, -2]$, $rf_1[n2, -2]$ | ... |
| f[t+1] | $rf_0[n1, -1]$, $rf_1[n1, -1]$ | $rf_0[n2, -1]$, $rf_1[n2, -1]$ | ... |
| f[t] | $rf_0[n1, 0]$, $rf_1[n1, 0]$ | $rf_0[n2, 0]$, $rf_1[n2, 0]$ | ... |
| f[t-1] | $rf_0[n1, 1]$, $rf_1[n1, 1]$ | $rf_0[n2, 1]$, $rf_1[n2, 1]$ | ... |
| f[t-2] | $rf_0[n1, 2]$, $rf_1[n1, 2]$ | $rf_0[n2, 2]$, $rf_1[n2, 2]$ | ... |
| f[t-3] | $rf_0[n1, 3]$, $rf_1[n1, 3]$ | $rf_0[n2, 3]$, $rf_1[n2, 3]$ | ... |

| | CORRELATION VALUE WITH SIGNAL PATTERN $p_0[t]$ OF BIT 0 | CORRELATION VALUE WITH SIGNAL PATTERN $p_1[t]$ OF BIT 1 | DECISION RESULT |
|---|---|---|---|
| WATERMARK SIGNAL (BASIC PATTERN $p_0[t]$) TO BE EMBEDDED INTO MOVING IMAGE DATA | 100 | 0 | BIT 0 |
| TIME SERIES SIGNAL $f[t]$ OF MOVING IMAGE DATA | 100 | 400 | BIT 1 |
| TIME SERIES SIGNAL OF MOVING IMAGE DATA IN WHICH WATERMARK SIGNAL IS EMBEDDED | 200 | 400 | BIT 1 |

| | CORRELATION VALUE WITH SIGNAL PATTERN $p_0[t]$ OF BIT 0 | CORRELATION VALUE WITH SIGNAL PATTERN $p_1[t]$ OF BIT 1 | DECISION RESULT |
|---|---|---|---|
| WATERMARK SIGNAL (BASIC PATTERN $p_0[t]$) TO BE EMBEDDED INTO MOVING IMAGE DATA | 100 | 0 | BIT 0 |
| TIME SERIES SIGNAL $f[t-1]$ OF MOVING IMAGE DATA | 400 | 0 | BIT 0 |
| TIME SERIES SIGNAL OF MOVING IMAGE DATA IN WHICH WATERMARK SIGNAL IS EMBEDDED | 500 | 0 | BIT 0 |

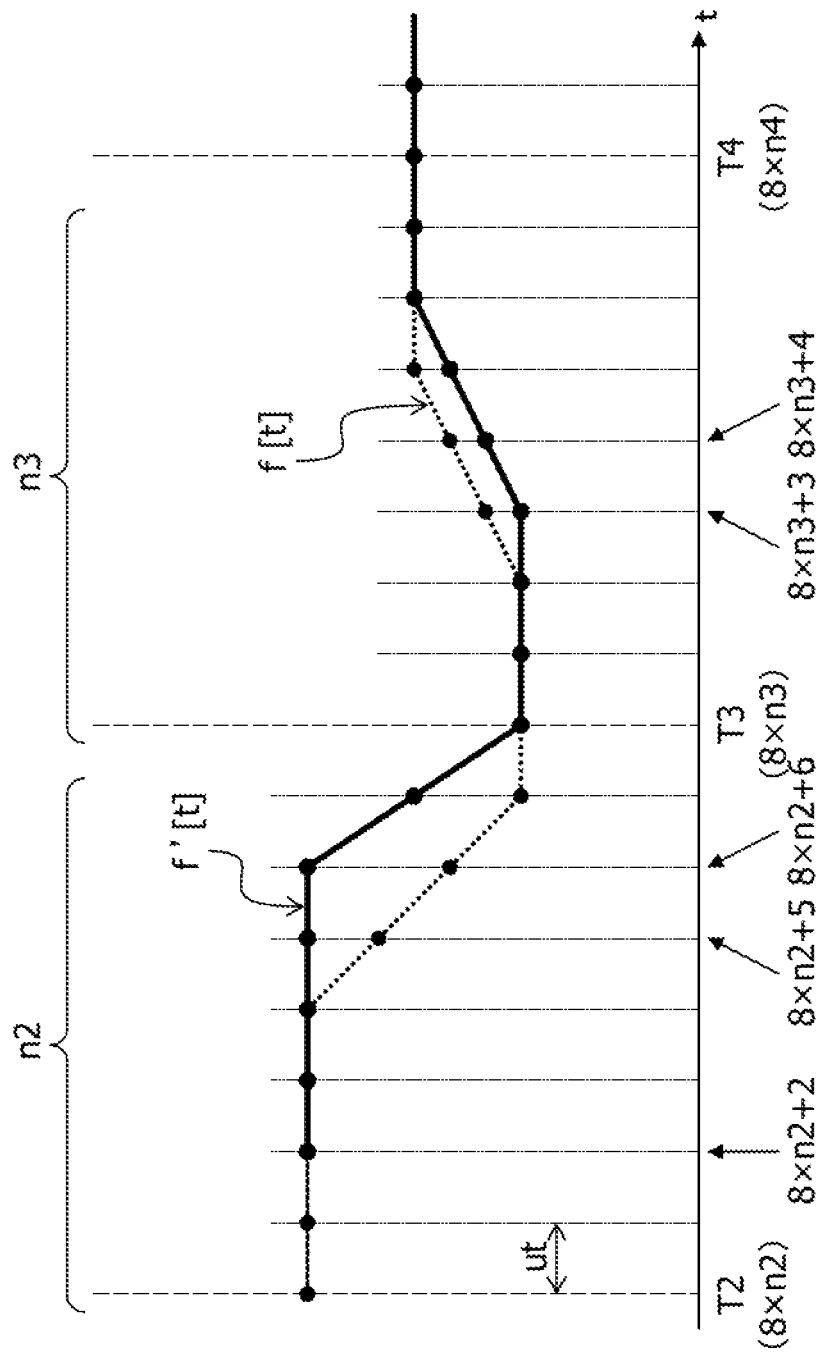

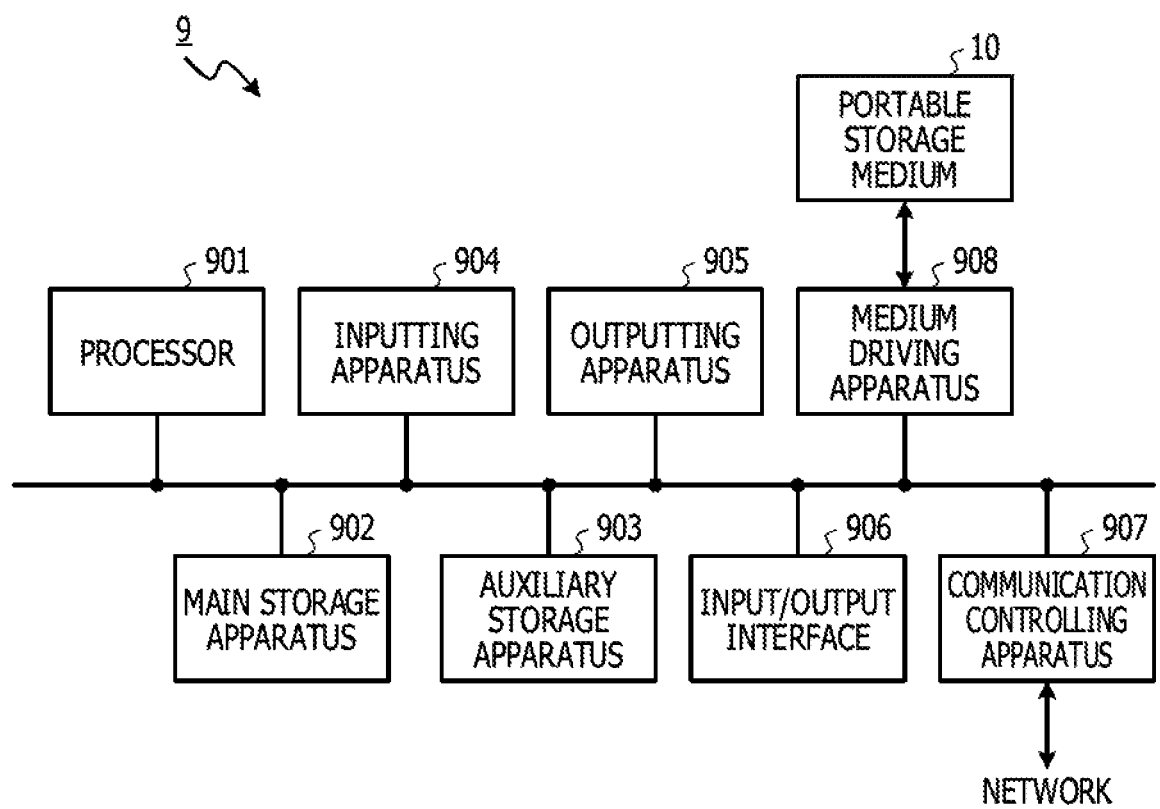

APPARATUS FOR EMBEDDING DIGITAL WATERMARK AND METHOD FOR EMBEDDING DIGITAL WATERMARK

CROSS-REFERENCE TO RELATED APPLICATION

This application is based upon and claims the benefit of priority of the prior Japanese Patent Application No. 2016-191220, filed on Sep. 29, 2016, the entire contents of which are incorporated herein by reference.

FIELD

The embodiments discussed herein relate to an apparatus for embedding a digital watermark and a method for embedding a digital watermark.

BACKGROUND

In recent years, attention is paid to a technology for embedding a digital watermark that adds various kinds of information to a digital content such as moving image data. For example, by embedding watermark information including copyright information, purchase information or the like relating to moving image data into the moving image data, when the moving image data leaks illegally through the Internet or the like, it is possible to specify the leaking source.

Further, a digital watermark may be utilized for presentation of detailed information regarding a commodity or a service to be introduced by moving image data that is utilized, for example, in a digital signage (electronic advertisement) or the like, distribution of coupons and so forth.

When watermark information is embedded into a digital content, it is desired to suppress deterioration of the content caused by embedding of the watermark information. As one of methods for suppressing deterioration of a content by embedding of watermark information, there is a method of determining a filter coefficient corresponding to embedding information to be embedded into an original signal and adjusting the phase of the original signal in accordance with the filter coefficient (refer, for example, to Japanese Laid-open Patent Publication No. 2004-341066). As a suppression method of the type described, there is a method of using the original signal after the phase adjustment as an embedding object signal.

When watermark information is embedded into a digital content, it is desired to suppress deterioration of the content caused by embedding of the watermark information. As one of technologies for suppressing deterioration of a content, there is a technology to determine a filter coefficient corresponding to information to be embedded into an original signal, adjust the phase of the original signal in accordance with the filter coefficient, and use the original signal after the phase adjustment as an embedding object signal (refer, for example, to Japanese Laid-open Patent Publication No. 2004-341066).

Further, when watermark information is embedded into a digital content, it is desired that information is not lost even if the content of image data or the like in which the information is embedded is processed. As one of technologies for suppressing loss of information embedded in a content, there is a technology to use, when a value of image data is changed while an edge and an isolated point in the image are preserved, a value between a value of an original picture and a value of an image after the image process as a change value (refer, for example, to Japanese Laid-open Patent Publication No. 2001-61055). Further, as another technology for suppressing loss of information embedded in a content, there is a method in which data in which a digital watermark pattern is embedded is analyzed to decide a degree of embedding of the digital watermark and an embedding parameter is adjusted based on the decision (refer, for example, to Japanese Laid-open Patent Publication No. 2010-258585). According to the technologies, it is possible to achieve both suppression of deterioration of a content and suppression of loss of information embedded in the content.

SUMMARY

According to an aspect of the embodiments, an apparatus for embedding a digital watermark includes a memory, and a processor coupled to the memory and configured to generate a watermark signal to be embedded into moving image data based on information to be added to the moving image data, determine a frame of the moving image data at which overlapping of the watermark signal is to be started based on a variation in value in a time direction of a pixel in a region, in each of a plurality of frames of the moving image data, into which the watermark signal is to be embedded and also on a feature of the watermark signal, and embed the watermark signal beginning with the determined frame.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a flow chart illustrating a process executed by a digital watermark embedded apparatus according to the first embodiment;

FIGS. 8A, 8B, 8C, and 8D depict views illustrating examples of shifting of a time series signal in a time axis direction;

FIG. 11 is a view illustrating generated second feature amounts;

FIG. 14 is a view illustrating a result of bit decision of a watermark signal within a section illustrated in FIG. 13A;

FIG. 16 is a view illustrating a result of bit decision of a watermark signal within a section illustrated in FIG. 15A;

FIG. 17B is a view (part 2) illustrating an example of a method for fine adjustment of moving image data;

FIGS. 20A and 20B depict views illustrating a range within which an optimum route is searched for; and FIG. 21 is a view depicting a hardware configuration of a computer.

DESCRIPTION OF EMBODIMENTS

When watermark information is to be regenerated from a watermark signal embedded in a content such as moving image data, information included in the content itself becomes noise, which sometimes disturbs the watermark signal from being detected correctly from the content.

According to one aspect, the embodiments discussed herein suppress moving image data from becoming noise to detection of a watermark signal.

First Embodiment

Figure 1:
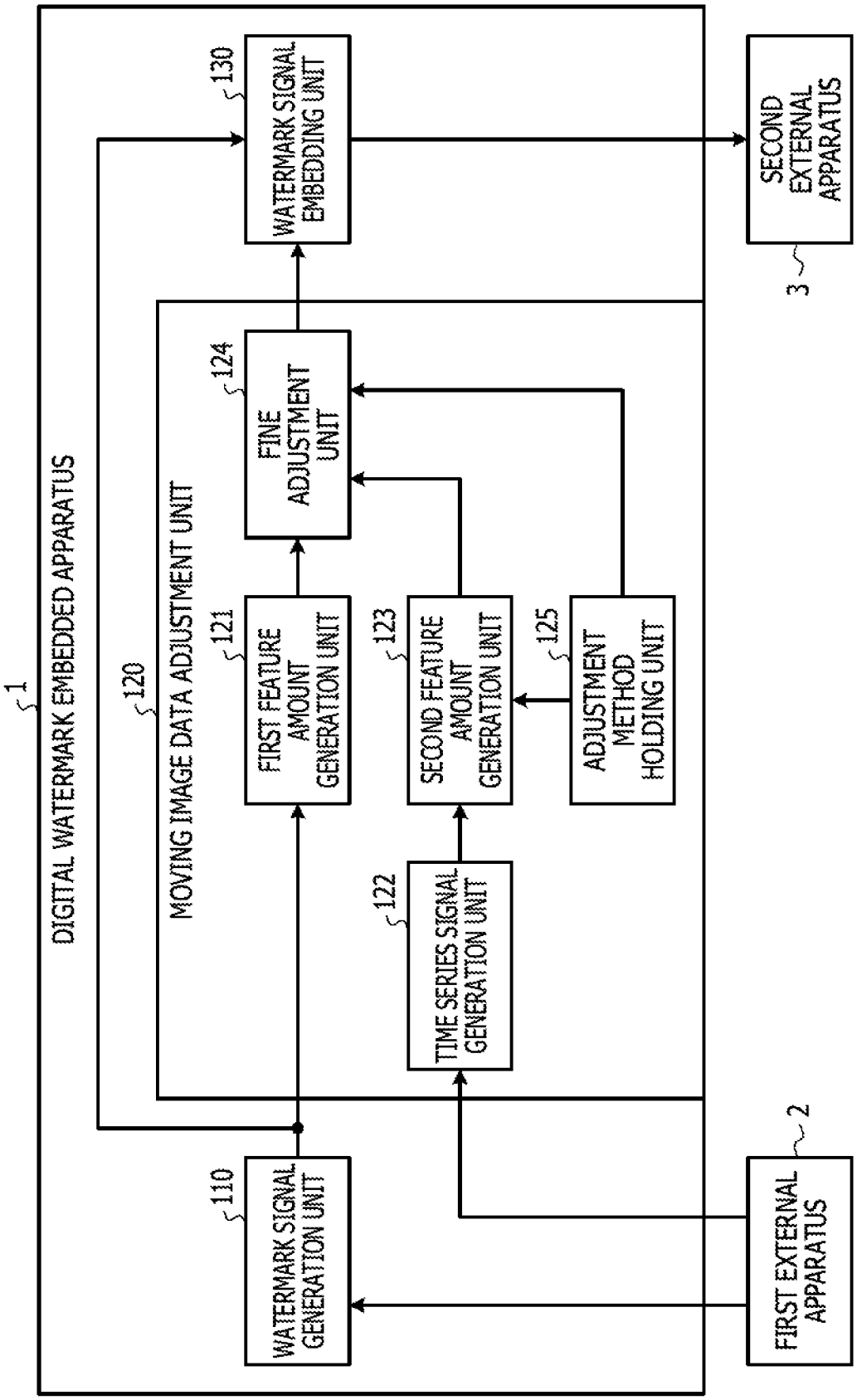
FIG. 1 is a block diagram depicting a functional configuration of a digital watermark embedded apparatus according to a first embodiment.

FIG. 1 is a block diagram depicting a functional configuration of a digital watermark embedded apparatus according to a first embodiment.

As depicted in FIG. 1, a digital watermark embedded apparatus 1 according to the present embodiment includes a watermark signal generation unit 110, a moving image data adjustment unit 120, and a watermark signal embedding unit 130.

The watermark signal generation unit 110 generates, based on watermark information inputted from a first external apparatus 2 or the like, a watermark signal to be embedded into moving image data inputted from the first external apparatus 2 or the like. In the present embodiment, the watermark information inputted from the digital watermark embedded apparatus 1 is information of a plurality of digits represented by a combination of "0" and "1." The watermark signal generation unit 110 generates a watermark signal by coupling a basic signal pattern representative of "0" in watermark information and another basic signal pattern representative of "1" in the watermark information in accordance with an order of "0" and "1" in the watermark information. The basic signal pattern representative of "0" and the basic signal pattern representative of "1" have the same time length (for example, a time length corresponding to eight frames of moving image data) and besides have different waveforms from each other. In the following description, the basic signal pattern representative of "0" is referred to as basic signal pattern of the bit 0 or signal pattern of the bit 0. Further, in the following description, the basic signal pattern representative of "1" is referred to as basic signal pattern of the bit 1 or signal pattern of the bit 1.

The moving image data adjustment unit 120 determines a frame of moving image data at which overlapping of a watermark signal is to be started based on a variation of the value in a time direction of pixels in a region into which a watermark signal is to be embedded in each of a plurality of frames of the moving image data and a feature of the watermark signal. For example, the moving image data adjustment unit 120 performs fine adjustment of a video signal of moving image data in the time axis direction based on inputted moving image data and a watermark signal generated by the watermark signal generation unit 110.

The watermark signal embedding unit 130 embeds a watermark signal beginning with the frame determined by the moving image data adjustment unit 120. For example, the watermark signal embedding unit 130 embeds the watermark signal generated by the watermark signal generation unit 110 into the moving image data finely adjusted by the moving image data adjustment unit 120. The moving image data having the watermark signal embedded therein is outputted, for example, to a second external apparatus 3. The second external apparatus 3 includes a display apparatus that reproduces and displays the moving image data.

The moving image data adjustment unit 120 determines a frame of moving image data at which overlapping of a watermark signal is to be started based on a variation of the value in the time direction of pixels in the region into which a watermark signal is to be embedded in each of a plurality of frames of moving image data and a characteristic of the watermark signal as described above. The moving image data adjustment unit 120 includes a first feature amount generation unit 121, a time series signal generation unit 122, a second feature amount generation unit 123, a fine adjustment unit 124, and an adjustment method holding unit 125.

The first feature amount generation unit 121 generates (calculates) a first feature amount representative of a feature of a watermark signal to be used when watermark information is restored from a watermark signal. For example, the first feature amount generation unit 121 divides the watermark signal for each time length of the basic signal patterns and calculates a correlation value between the basic signal pattern of the bit 0 and the basic signal pattern of the bit 1 for each divisional signal pattern of the watermark signal.

The time series signal generation unit 122 generates a time series signal representative of a time variation of a video signal within a given region of each frame of moving image data. The time series signal generation unit 122 calculates an average value of pixel values (or luminance values) of a plurality of pixels included in a given region of the display screen for each one frame and arranges the average values in a time series to generate a time series signal. Here, the display screen is a display region when moving image data is reproduced and displayed (as a moving image) on the display apparatus, and the given region of the display screen is a region in which a watermark signal is to be embedded. The given region in the display screen may be, for example, the overall area of the display screen or may be one given block when the display screen is divided into a plurality of blocks (small regions).

The second feature amount generation unit 123 generates (calculates) a value representative of a correlation between a time series signal and the basic signal patterns of a watermark signal based on a time series signal and an adjustment method used to finely adjust moving image data. For example, the second feature amount generation unit 123 divides the time series signal for each time length of the basic signal patterns and calculates, for each divisional signal pattern of the time series signal, a correlation value between the basic signal pattern of the bit 0 and the basic signal pattern of the bit 1. Further, the second feature amount generation unit 123 shifts the overall time series signal within a range determined by the adjustment method described above in a unit of a frame in the time axis direction and generates a second feature amount of each signal pattern in the shifted time series signal. The adjustment method described above is held in the adjustment method holding unit 125. The range within which a time series signal is to be shifted in the time axis direction may be designated in a period of time (for example, ±100 milliseconds. or the like) or may be designated in a frame number (for example, ±3 frames or the like).

The fine adjustment unit 124 performs fine adjustment of a video signal of moving image data in the time axis direction based on a first feature amount, a second feature amount, and an adjustment method. The fine adjustment unit 124 first specifies, based on a first feature amount and a second feature amount, for each divisional sections of the time series signal for each time length of the basic signal patterns, a shift amount for a time series signal, with which the correlation with the basic signal patterns to be embedded into the section is highest. Thereafter, the fine adjustment unit 124 rewrites the pixel value of the pixels in the watermark image embedding region of each frame based on the specified shift amount of the time series signal.

The digital watermark embedded apparatus 1 according to the present embodiment executes processes, for example, at steps S1 to S7 depicted in FIG. 2 when moving image data and watermark information to be embedded into the moving image data are inputted from the first external apparatus 2 or the like.

FIG. 2 is a flow chart illustrating a process executed by a digital watermark embedded apparatus according to the first embodiment.

The digital watermark embedded apparatus 1 first generates a watermark signal based on watermark information (step S1). The process at step S1 is performed by the watermark signal generation unit 110. The watermark signal generation unit 110 generates a watermark signal in which the signal pattern of the bit 0 and the signal pattern of the bit 1 are coupled to each other in accordance with an order in which "0" and "1" are lined up in the watermark information.

Thereafter, the digital watermark embedded apparatus 1 performs a process for determining a frame of the moving image data at which overlapping of the watermark signal is to be started (steps S2 to S6) and a process for embedding the watermark signal beginning with the frame determined by the processes at steps S2 to S6 (step S7). The processes at steps S2 to S6 are performed by the moving image data adjustment unit 120. The moving image data adjustment unit 120 determines a frame of the moving image data at which overlapping of the watermark signal is to be started based on a variation of a value in the time direction of pixels in the region into which the watermark signal is to be embedded in each of a plurality of frames of the moving image data and a feature of the watermark signal. Further, the process at step S7 is performed by the watermark signal embedding unit 130.

After the watermark signal is generated, the digital watermark embedded apparatus 1 generates a first feature amount from the watermark signal (step S2). The process at step S2 is performed by the first feature amount generation unit 121 of the moving image data adjustment unit 120. The first feature amount generation unit 121 divides the watermark signal into a plurality of sections with the time length of the basic signal patterns and generates (calculates), for each signal pattern in each section, a correlation value of the signal pattern with the basic signal pattern of the bit 0 and the basic signal pattern of the bit 1 as a first feature amount.

Then, the digital watermark embedded apparatus 1 generates a time series signal from the moving image data (step S3). The process at step S3 is performed by the time series signal generation unit 122 of the moving image data adjustment unit 120. The time series signal generation unit 122 calculates, for each frame of the moving image data, an average value of pixel values (or luminance values) of respective pixels included in the given region of the display screen and lines up the average values in a time series to generate a time series signal.

Then, the digital watermark embedded apparatus 1 acquires an adjustment method for the moving image data (step S4) and generates a second feature amount based on the time series signal and the acquired adjustment method (step S5). The processes at steps S4 and S5 are performed by the second feature amount generation unit 123 of the moving image data adjustment unit 120. At step S4, the second feature amount generation unit 123 refers to the adjustment method holding unit 125 to acquire an adjustment method including a range within which the time series signal is to be shifted in the time axis direction. At step S5, the second feature amount generation unit 123 generates (calculates) a second feature amount representative of a correlation between the time series signal and the basic signal patterns of the watermark signal based on the time series signal and the acquired adjustment method. The second feature amount generation unit 123 divides the time series signal into a plurality of sections with a time length of the basic signal patterns of the time series signal and calculates, for each signal pattern in each section, a correlation value with the basic signal pattern of the bit 0 and a correlation value with the basic signal pattern of the bit 1. Further, the second feature amount generation unit 123 shifts the overall time series signal within the range determined by the adjustment method described hereinabove in the time axis direction and generates (calculates) a second feature amount regarding the shifted time series signal.

Then, the digital watermark embedded apparatus 1 finely adjusts the moving image data based on the first feature amount, the second feature amount, and the adjustment method (step S6). The process at step S6 is performed by the fine adjustment unit 124 of the moving image data adjustment unit 120. The fine adjustment unit 124 calculates, for each section when the time series signal is divided into a plurality of sections with a time length of the basic signal patterns, a shift amount of the time series signal with which the sum of the first feature amount and the second feature amount to the basic signal patterns is in the maximum. Thereafter, the fine adjustment unit 124 performs, based on the shift mount in each section of the time series signal, fine adjustment of the video signal of the moving image data in the time axis direction.

Thereafter, the digital watermark embedded apparatus 1 embeds the watermark signal into the finely adjust moving image data (step S7). The process at step S7 is performed by the watermark signal embedding unit 130. The watermark signal embedding unit 130 embeds the watermark signal into the moving image data, for which fine adjustment of the video signal in the time axis direction has been performed by the fine adjustment unit 124, in accordance with a known embedded method for a watermark signal. The watermark signal embedding unit 130 outputs the moving image data in which the watermark signal is embedded to the second external apparatus 3 or the like.

It is to be noted that the flow chart of FIG. 2 is nothing but an example of a process performed by the digital watermark embedded apparatus 1. The order of the processes at steps S1 to S5 may be changed suitably within a range within which a condition that the process at step S2 is performed later than the process at step S1 and besides the process at step S5 is performed later than the processes at steps S3 and S4 is satisfied. For example, the processes at steps S1 to S5 that are performed by the digital watermark embedded apparatus 1 may be performed in a different order in which the processes at steps S1 and S2 are performed after the processes at steps S3 to S5. Alternatively, the digital watermark embedded apparatus 1 may perform the processes at steps S1 and S2 and the processes at steps S3 to S5 in parallel to each other.

In the following, the processes at steps S1 to S6 performed by the digital watermark embedded apparatus 1 are described particularly with reference to FIGS. 3 to 16, 17A, and 17B. It is to be noted that the following description is directed to an example in which moving image data is divided into sections for each eight successive frames and embeds one value ("0" or "1") of watermark information into each section.

Figure 3A:
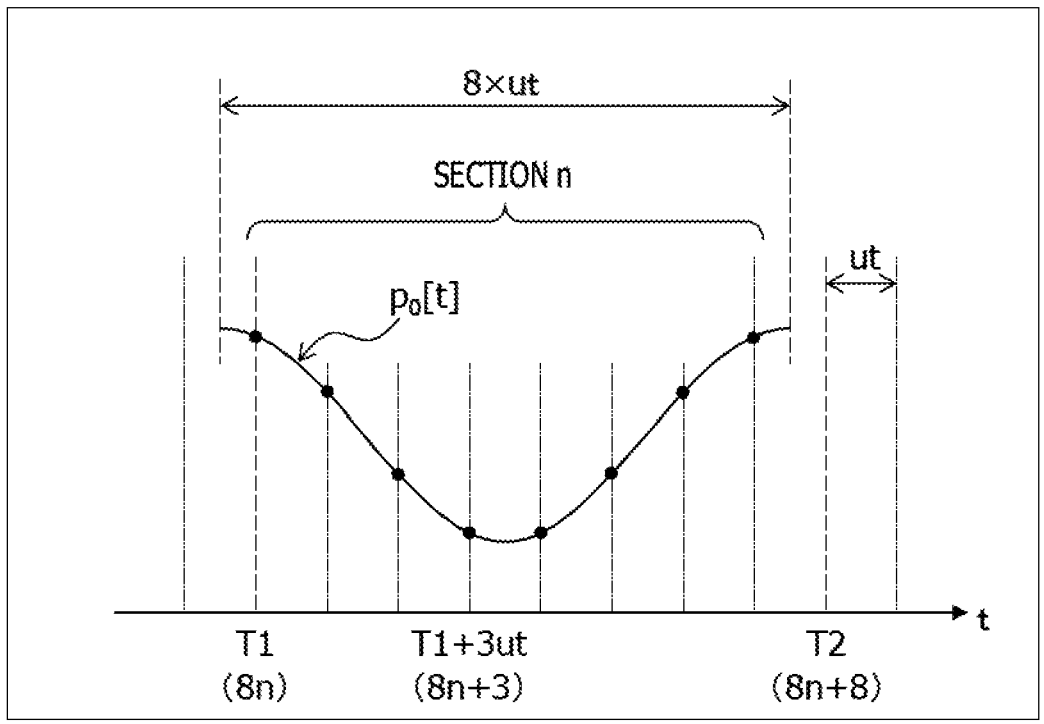
FIGS. 3A and 3B depict views illustrating examples of basic signal patterns of a watermark signal.
Figure 3B:
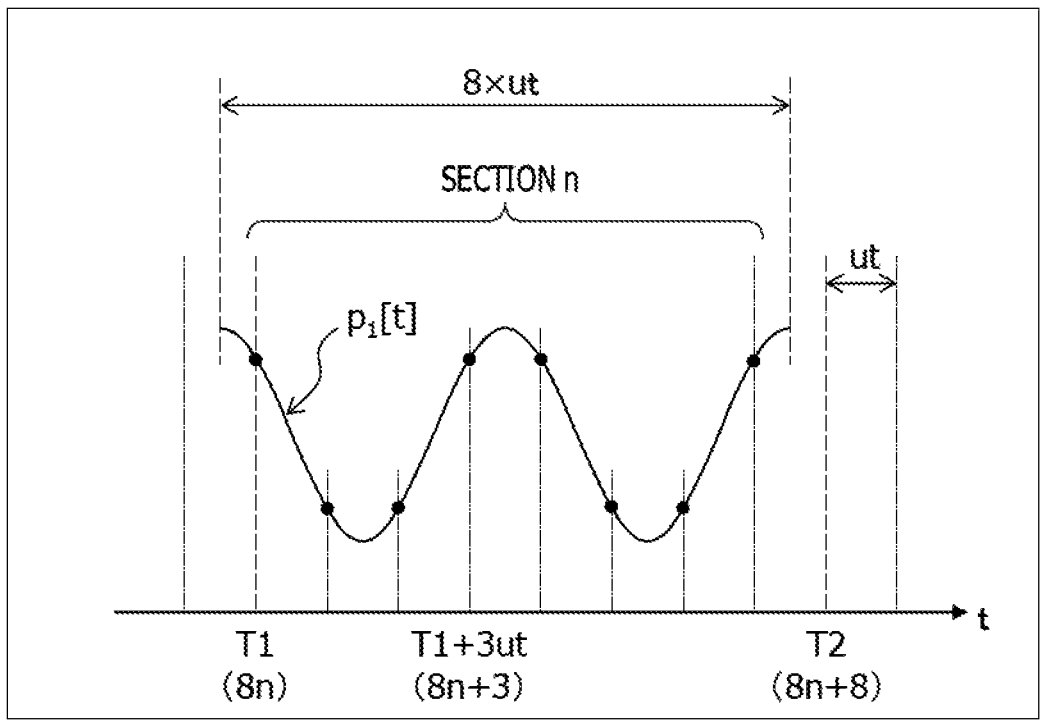

FIG. 3 depicts views illustrating examples of basic signal patterns of a watermark signal. In FIG. 3A, a basic signal pattern (signal pattern of the bit 0) $p_0[t]$ representative of "0" in watermark information is depicted. Meanwhile in FIG. 3B, the other basic signal pattern (signal pattern of the bit 1) p[t] representative of "1" in the watermark signal is depicted.

In FIGS. 3A and 3B, the axis t of abscissa represents time. If moving image data is reproduced, respective frames are reproduced in a time series order at time intervals ut, which depends upon the frame rate, and displayed on a display apparatus or the like. Time T1 in FIGS. 3A and 3B is a point of time at which a frame, which is a first one, in the time series order, of eight frames included in the nth section from the top when the moving image data is divided into sections for each eight frames, is reproduced. Meanwhile, time T2 in FIGS. 3A and 3B is a point of time at which the first frame in the time series order from among the eight frames included in the n+1th section from the top when the moving image data is divided into sections for each eight frames is reproduced. For example, the frame to be reproduced at time T1 is the 8nth frame in the time series order from among all frames of the moving image data, and the frame to be produced at time T2 is the 8n+8th frame in the time series order from among all frames of the moving image data. Further, the frame to be produced at time T1+3ut is the 8n+3th frame in the time series order from among all frames of the moving image data.

The digital watermark embedded apparatus 1 according to the present embodiment generates a watermark signal in which the basic signal patterns of the time length for eight frames (8×ut) of the moving image data are coupled to each other and embeds the watermark signal into the moving image data in such a manner as described above.

The signal pattern $p_0[t]$ of the bit 0 depicted in FIG. 3A is a waveform pattern within a range of $0 \le (t\pi/4) \le 2\pi$ (for example, for one cycle) of a cosine wave represented by the expression (1-1) below.

$$p_0[t] = \cos(t\pi/4) \qquad (1\text{-}1)$$

When the signal pattern $p_0[t]$ of the bit 0 is to be embedded into an nth section of the moving image data, for example, time $\{T1-(ut/2)\}$ is set to a time position of $(t\pi/4)=0$ of the signal pattern $p_0[t]$ as depicted in FIG. 3A. Then, based on the value of the signal pattern $p_0[t]$ at a reproduction time point of each frame, the pixel value of pixels in the region of the frame into which a watermark signal is to be embedded is rewritten. In the following description, the region into which a watermark signal is to be embedded is referred to also as watermark signal embedding region.

The signal pattern $p_1[t]$ illustrated in FIG. 3B is a waveform pattern within a range of $0 \le (t\pi/2) \le 4\pi$ of a cosine wave represented by the expression (1-2) given below.

$$p_1[t] = \cos(t\pi/2) \qquad (1\text{-}2)$$

When the signal pattern $p_1[t]$ of the bit 1 is to be embedded into an nth section of the moving image data, for example, time $\{T1-(ut/2)\}$ is set to a time position of $(t\pi/2)=0$ of the signal pattern $p_1[t]$ as depicted in FIG. 3B. Then, based on the value of the signal pattern $p_1[t]$ at a reproduction time point of each frame, the pixel value of pixels in the watermark signal embedding region of the frame is rewritten.

It is to be noted that, in the examples illustrated in FIGS. 3A and 3B, the time $\{T1-(ut/2)\}$ is a time position of one end of the signal patterns $p_0[t]$ and $p_1[t]$. However, the time position of one end of the signal patterns $p_0[t]$ and $p_1[t]$ may be the aforementioned time and may be any point of time within a period from (T1−ut) to time T1.

Figure 4:
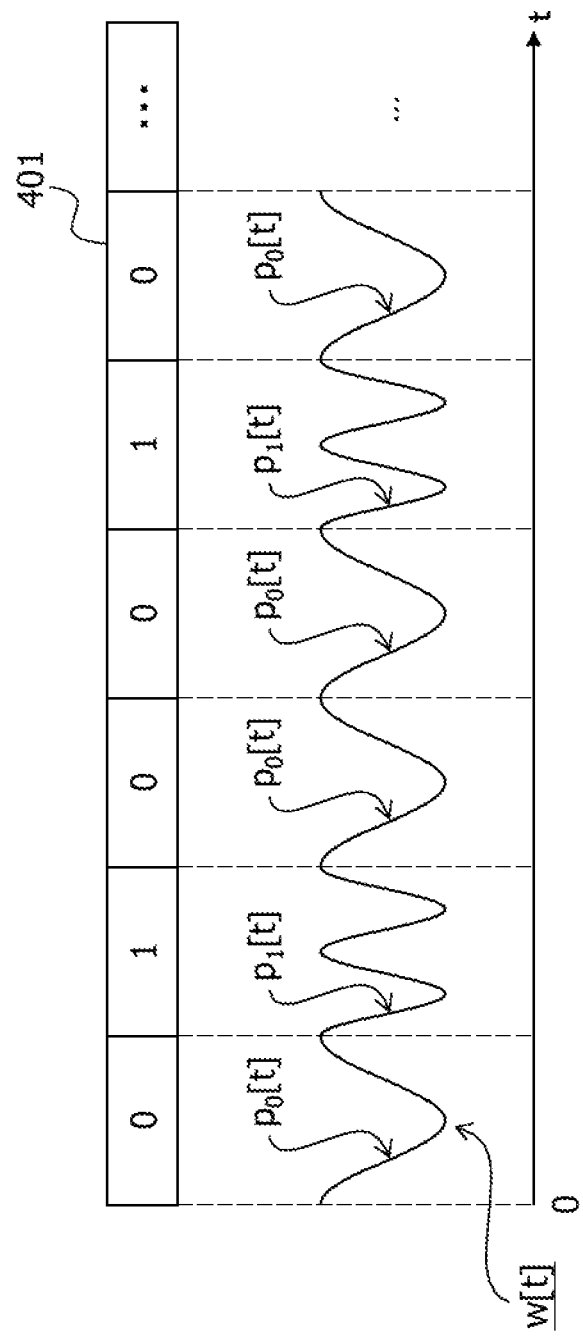
FIG. 4 is a view illustrating an example of a watermark signal.

FIG. 4 is a view illustrating an example of a watermark signal.

Watermark information to be embedded into moving image data is information in which copyright information or information related to moving image data (for example, a uniform resource locator (URL) of a web site or the like) is represented by a combination of "0" and "1." In the process at step S1 described hereinabove, the watermark signal generation unit 110 couples the signal pattern $p_0[t]$ of the bit 0 and the signal pattern $p_1[t]$ of the bit 1 in accordance with an order in which "0" and "1" are lined up in the watermark information to generate such a watermark signal w[t] as illustrated in FIG. 4. In the example illustrated in FIG. 4, watermark information 401 is "010010 . . . ." Therefore, the watermark signal generation unit 110 places the signal pattern $p_0[t]$ of the bit 0 to the top and successively couples the signal patterns in the order of the signal pattern $p_1[t]$ of the bit 1, the signal pattern $p_0[t]$ of the bit 0, and the signal pattern $p_0[t]$ of the bit 0 to the signal pattern $p_0[t]$ of the top. Thereafter, the watermark signal generation unit 110 further couples the signal pattern $p_1[t]$ of the bit 1, the signal pattern $p_0[t]$ of the bit 0, . . . successively to generate a watermark signal w[t].

After the process for generating a watermark signal (step S1) comes to an end, the digital watermark embedded apparatus 1 subsequently performs the process for generating a first feature amount by the first feature amount generation unit 121 (step S2).

Figure 5:
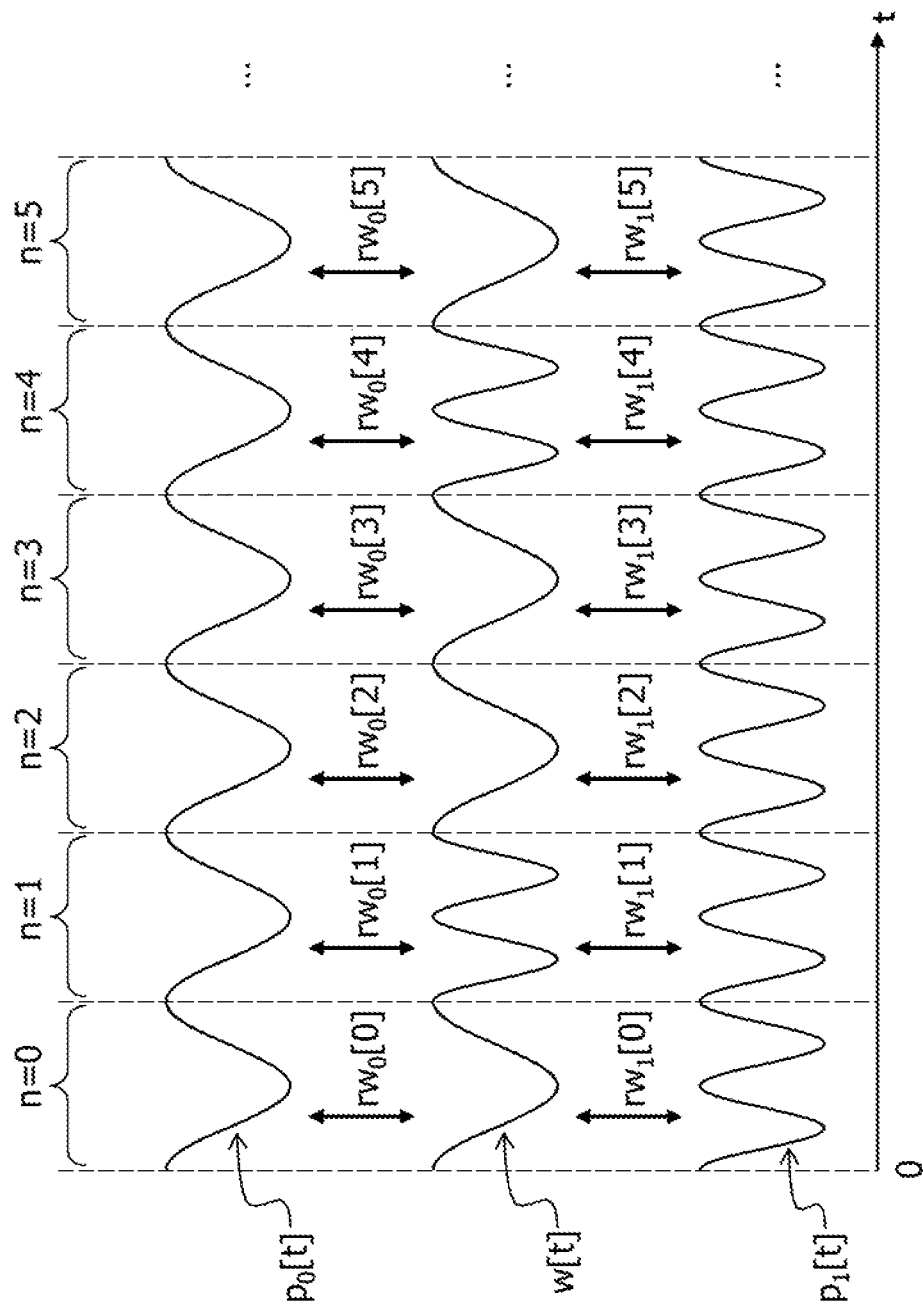
FIG. 5 is a view illustrating a generation method of a first feature amount.
Figure 6:
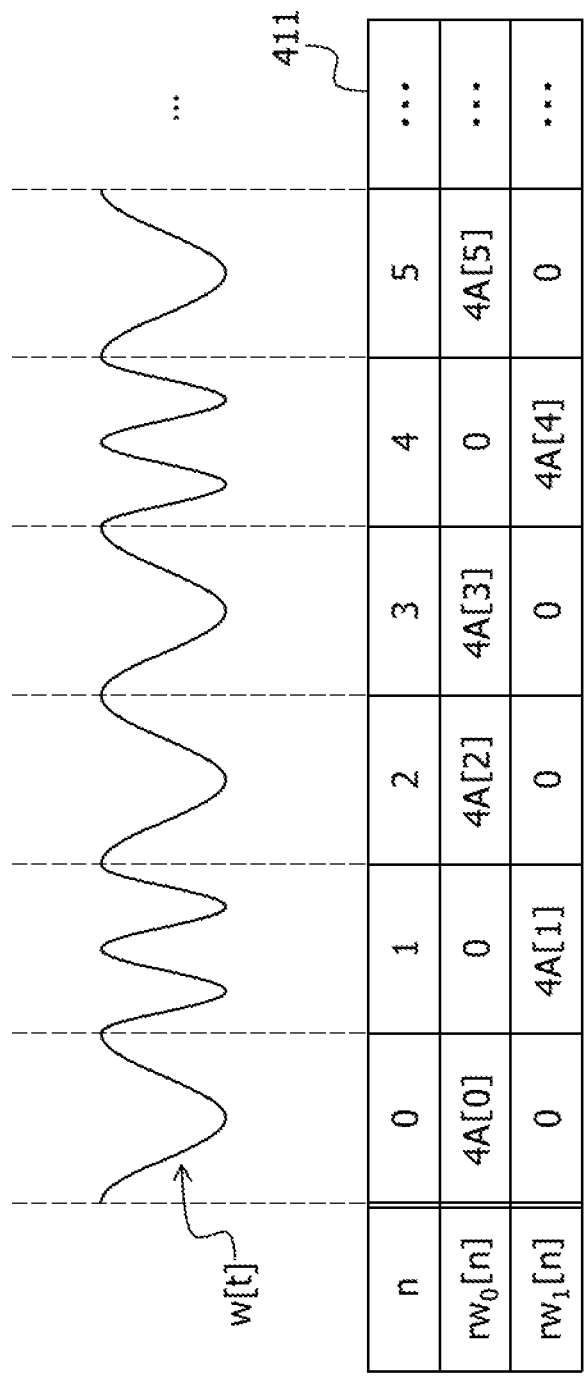
FIG. 6 is a view illustrating generated first feature amounts.

FIG. 5 is a view illustrating a generation method of a first feature amount. FIG. 6 is a view illustrating generated first feature amounts.

The first feature amount generation unit 121 calculates, as the first feature amount, a correlation value with the signal pattern $p_0[t]$ of the bit 0 and a correlation value with the signal pattern $p_1[t]$ of the bit 1 for each section of the watermark signal w[t] (for example, for each time length corresponding to eight frames of the moving image data).

The correlation value $rw_0[n]$ between the nth section of the watermark signal w[t] and the signal pattern $p_0[t]$ of the bit 0 is calculated in accordance with the expression (2-1) given below. Further, the correlation value $rw_1[n]$ between the nth section of the watermark signal w[t] and the signal pattern $p_1[t]$ of the bit 1 is calculated in accordance with the expression (2-2) given below.

$$rw_0[n] = \sum_{t=8n}^{8n+7} w[t] \times p_0[t] = \begin{cases} 4A[n] & where w[t] = p_0[t] \\ 0 & where w[t] = p_1[t] \end{cases} \quad (2\text{-}1)$$

$$rw_1[n] = \sum_{t=8n}^{8n+7} w[t] \times p_1[t] = \begin{cases} 0 & where w[t] = p_0[t] \\ 4A[n] & where w[t] = p_1[t] \end{cases} \quad (2\text{-}2)$$

t in the expressions (2-1) and (2-2) corresponds to points of time reproduction of eight frames included in a section n of the moving image data. Further, A[n] in the expressions (2-1) and (2-2) is an amplitude of the watermark signal (basic signal patterns) in the nth section.

In the example illustrated in FIG. 5, the first (n=0) section of the watermark signal w[t] is the signal pattern $p_0[t]$ of the bit 0. Therefore, the correlation value $rw_0[0]$ between the first section of the watermark signal w[t] and the signal pattern $p_0[t]$ of the bit 0 is given as $rw_0[0]=4A[0]$ from the expression (2-1). Meanwhile, the correlation value $rw_1[0]$ between the first section of the watermark signal w[t] and the signal pattern $p_1[t]$ of the bit 1 is given by $rw_1[0]=0$ from the expression (2-2).

On the other hand, the second (n=1) section of the watermark signal w[t] is the signal pattern $p_1[t]$ of the bit 1. Therefore, the correlation value $rw_0[0]$ between the second section of the watermark signal w[t] and the signal pattern $p_0[t]$ of the bit 0 is given as $rw_0[1]=0$ from the expression (2-1). Meanwhile, the correlation value $rw_1[1]$ between the second section of the watermark signal w[t] and the signal pattern $p_1[t]$ of the bit 1 is given by $rw_1[1]=4A[1]$ from the expression (2-2).

If the correlation value $rw_0[n]$ with the signal pattern $p_0[t]$ of the bit 0 and the correlation value $rw_1[n]$ with the signal pattern $p_1[t]$ of the bit 1 in each section of the watermark signal w[t] are calculated in this manner, such a result as indicated by a table 411 illustrated in FIG. 6 is obtained.

After the first feature amount generation unit 121 calculates the correlation values $rw_0[n]$ and $rw_1[n]$ in all sections of the watermark signal w[t], it transmits the calculated correlation values $rw_0[n]$ and $rw_1[n]$ as a first feature amount to the fine adjustment unit 124. When the first feature amount generation unit 121 transmits the first feature amount to the fine adjustment unit 124, the process at step S2 comes to an end.

After the process at step S2 comes to an end, the digital watermark embedded apparatus 1 subsequently performs the process for generating a time series signal from the moving image data by the time series signal generation unit 122 (step S3).

Figure 7:
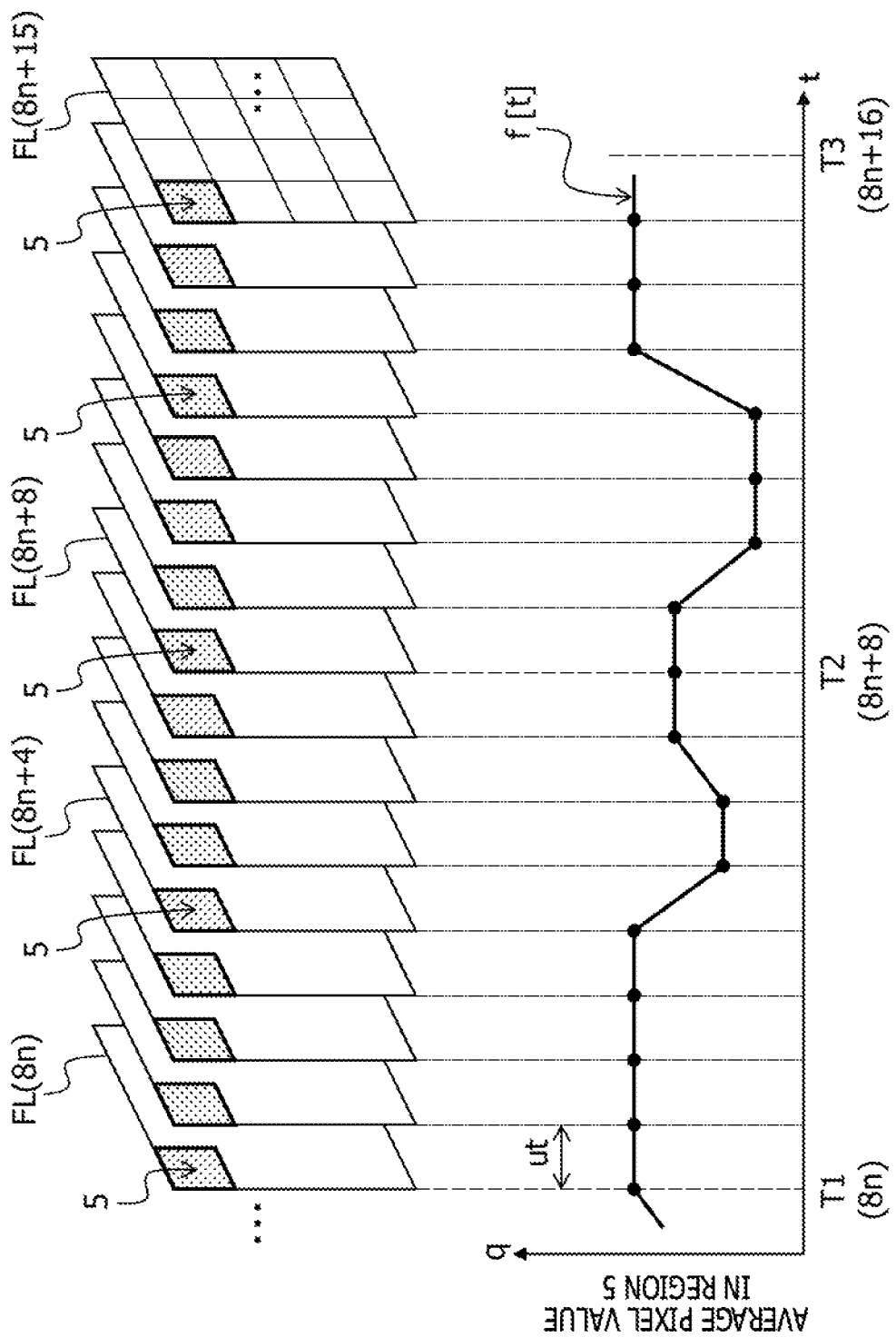
FIG. 7 is a view illustrating a generation method of a time series signal.

FIG. 7 is a view illustrating a generation method of a time series signal.

As depicted in FIG. 7, moving image data include a plurality of frames FL, and one moving image (video) is obtained by reproducing the respective frames FL in a time series order. In FIG. 7, the axis t of abscissa of a graph in a lower location represents time. If the moving image data is reproduced, the respective frames FL are reproduced in a time series order at time intervals ut that depend upon the frame rate and are displayed on a display apparatus or the like. In FIG. 7, "(8n)," "(8n+4)" or the like added to reference character FL representative of a frame represents a reproduction order number in the time series order among all frames of the moving image data. Time T1 in FIG. 7 is a point of time of reproduction of the 8nth frame FL(8n) in the time series order among all frames of the moving image data. For example, time T1 is a point of time of reproduction of the first frame FL(8n) in the time series order of eight frames included in the nth section from the top of the moving image data.

Time T2 in FIG. 7 is a point of time of reproduction of the first frame FL(8n+8) in the time series order from among eight frames included in the n+1th section from the top of the moving image data (for example, the 8n+8th frame from the top in the moving image data). Time T3 in FIG. 7 is a point of time of reproduction of the first frame FL(8n+16) in the time series order within eight frames included in the n+2th section from the top in the moving image data (for example, the 8n+16th frame from the top in the moving image data).

The time series signal generation unit 122 calculates an average value of pixel values of pixels included in a given region 5 of a display screen image of each frame FL and lines up the average values in a time series to produce a time series signal f[t]. The axis q of ordinate in the graph of FIG. 7 represents an average value of pixel values (average pixel value) of pixels included in the given region 5. The given region 5 is a region into which a watermark signal is to be embedded. In FIG. 7, a region at the left upper corner when one frame (display screen image) is divided into 4×4=16 regions is determined as the given region 5 (watermark signal embedding region).

It is to be noted that the watermark signal embedding region 5 may be the example depicted in FIG. 7, and the entire display screen image may be determined as the watermark signal embedding region 5. Further, where one frame (display screen image) is divided into a plurality of regions (blocks), the position of the watermark signal embedding region 5 in one screen image may be determined arbitrarily, and, for example, the region at the right upper corner in one screen image may be determined as the watermark signal embedding region 5. Furthermore, where one frame (display screen image) is divided into a plurality of regions (blocks), a plurality of blocks in one screen image may be used as watermark signal embedding region. Where a plurality of blocks in one screen image are used as watermark signal embedding regions, the set of the plurality of blocks may be used as one watermark embedding region, or each of the plurality of blocks may be used as one watermark signal embedding region. Where each of a plurality of blocks is used as one watermark signal embedding region, it is possible to embed different watermark signals from each other into the individual watermark signal embedding regions. Accordingly, where one screen image is divided into 16 blocks, 16 different watermark signals may be embedded in the maximum. Where a plurality of different watermark signals are embedded, the time series signal generation unit 122 generates a time series signal for each of the watermark signal embedding regions into which the watermark signals are to be embedded.

After the process at step S3 comes to an end, the digital watermark embedded apparatus 1 subsequently performs a process for generating a second feature amount based on the time series signal f[t] and the adjustment method for moving image data by the second feature amount generation unit 123 (steps S4 and S5). The second feature amount is a value representing a correlation with the signal pattern $p_0[t]$ of the bit 0 and the signal pattern $p_1[t]$ of the bit 1 of the watermark signal $w[t]$ within each section when the time series signal $f[t]$ is divided into sections of each eight frame. The adjustment method for moving image data is a method of finely adjusting the pixel values of pixels in the watermark signal embedding region 5 in each frame and includes information that designates a shift range of the time series signal $f[t]$ in the time axis direction when the second feature amount is calculated.

The second feature amount generation unit 123 first acquires an adjustment method for moving image data from the adjustment method holding unit 125 (step S4) and acquires information that designates a shift range of the time series signal $f[t]$ in the time axis direction. The shift range of the time series signal $f[t]$ is designated, for example, by a period of time, and the second feature amount generation unit 123 calculates a frame number by which the time series signal $f[t]$ may be shifted based on the frame rate (frame interval ut) of the moving image data and time information that designates the shift range. For example, if the time period that designates a shift range is 100 milliseconds and the frame rate of the moving image data is 30 fps, the shiftable frame number of the time series signal $f[t]$ is +3 frames.

FIG. 8 depicts views illustrating examples of shifting of a time series signal in a time axis direction.

The axis t of abscissa in FIGS. 8A to 8D indicates time, and time T1 is a point of time at which the first frame in the time series order from among eight frames included in the n1th section from the top when the moving image data is divided into sections of every eight frames is reproduced. For example, time T1 represents the (8×n1)th frame in the time series order from among all frames of the moving image data. Meanwhile, time T2 is a point of time at which the first frame in the time series order from among eight frames included in the n2 (=n1+1)th section from the top of the moving image data is reproduced. For example, time T2 represents the (8×n2)th frame in the time series order from among all frames of the moving image data. Furthermore, time T3 is a point of time at which the first frame in the time series order from among eight frames included in the n3 (=n2+1)th section from the top of the moving image data is reproduced. For example, time T3 represents the (8×n3)th frame in the time series order from among all frames of the moving image data.

FIG. 8C illustrates the time series signal $f[t]$ generated by the time series signal generation unit 122. The second feature amount generation unit 123 first calculates a second feature amount in regard to the time series signal $f[t]$. Further, where the shiftable frame number of the time series signal $f[t]$ is ±s frames, the second feature amount generation unit 123 calculates a second feature amount regarding the time series signal $f[t-s]$ within a range of ±s frames in the time axis direction of the time series signal $f[t]$. It is assumed that, in the following description, the shift amount s is an integer equal to or greater than 1. Further, it is assumed that the shift amount in the time axis forward direction is −s frames and the shift amount in the time axis rearward direction is +s frames.

FIG. 8B illustrates a time series signal $f[t+1]$ obtained by shifting the time series signal $f[t]$ by −1 frame. Meanwhile, in FIG. 8A, a time series signal $f[t+3]$ when the time series signal $f[t]$ is shifted by −3 frames is illustrated. Further, in FIG. 8D, a time series signal $f[t-3]$ obtained by shifting the time series signal $f[t]$ by +3 frames is illustrated.

Where the shift range of the time series signal $f[t]$ is ±3, the second feature amount generation unit 123 calculates a second feature amount in regard to each of seven time series signal $f[t-s]$ (−3≤s≤3) including time series signals $f[t+3]$, $f[t+1]$, $f[t]$, and $f[t-3]$.

It is to be noted that, when a second feature amount in regard to the time series signal $f[t-s]$ (s≠0) obtained by shifting the time series signal $f[t]$ in the time axis direction is to be calculated, the second feature amount generation unit 123 performs, for example, such a process as illustrated in FIG. 9 for a top portion of the time series signal $f[t-s]$ (s≠0).

FIG. 9 depicts views illustrating a processing method of a top portion when a time series signal is shifted.

The axis t of abscissa in FIGS. 9A to 9D indicates time, and time t=0 is a point of reproduction starting time when moving image data is reproduced. For example, time t=0 represents a frame that is the top frame in the time series order among all frames of the moving image data. Further, time t=1 to 9 represent second to tenth frames in the time series order among all frames of the moving image data, respectively.

Figure 9A:
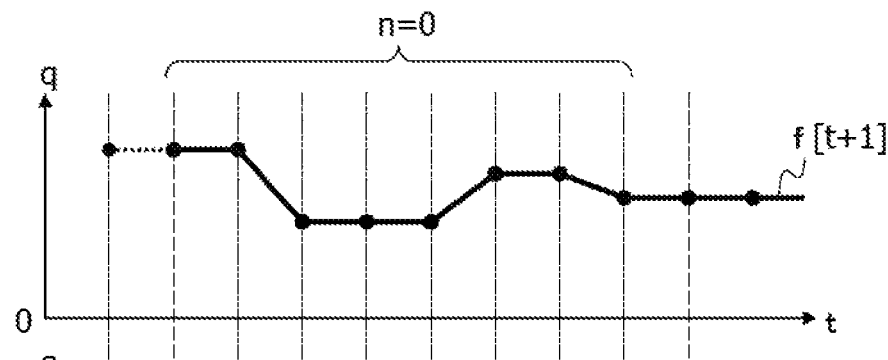
FIGS. 9A, 9B, 9C, and 9D depict views illustrating a processing method of a top portion of a time series signal when a time series signal is shifted.
Figure 9B:
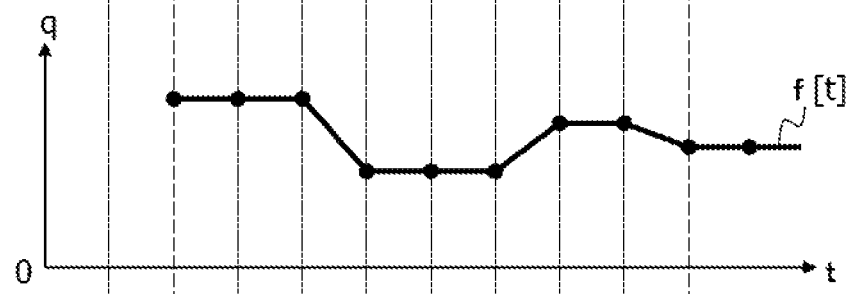

FIG. 9B illustrates the time series signal $f[t]$ generated by the time series signal generation unit 122. When a second feature amount regarding the time series signal $f[t]$ is to be generated, a correlation value between a variation pattern of an average pixel value in the top section (sections from $f[0]$ to $f[7]$) when the time series signal $f[t]$ is divided into sections of every eight frames and the basic signal patterns $p_0[t]$ and $p_1[t]$ is calculated first.

Meanwhile, when a second feature amount is calculated in regard to the time series signal $f[t-s]$ (s≠0), the second feature amount generation unit 123 calculates a correlation value between a variation pattern of an average pixel value within the sections $f[0]$ to $f[7]$ where the section $f[0]$ is the top and the basic signal patterns $p_0[t]$ and $p_1[t]$. It is to be noted that the section $f[0]$ of the time series signal $f[t-s]$ is a section at t−s=0, for example, is the time series signal $f[s]$ in the time series signal $f[t]$. Therefore, when a second feature amount in regard to the time series signal $f[t+s]$ obtained by shifting the time series signal $f[t]$ by −s frames is to be calculated, the second feature amount generation unit 123 calculates the second feature amount excluding the pixel average value where (t−s)<0. For example, in the time series signal $f[t+1]$ obtained by shifting the time series signal $f[t]$ by −1 frame, the second feature amount is calculated excluding the average pixel value regarding the frame corresponding to time t=0 in the time series signal $f[t]$ as depicted in FIG. 9A.

Figure 9C:
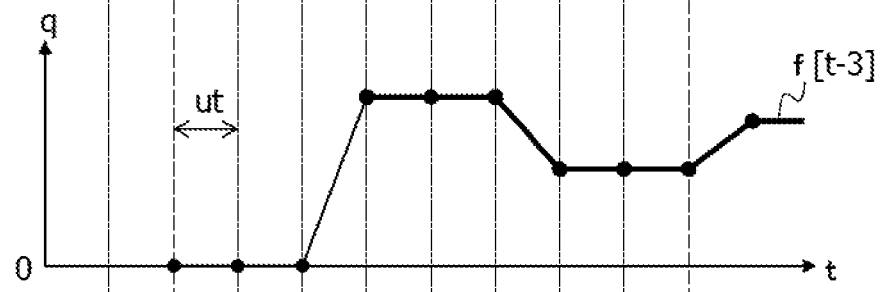
Figure 9D:
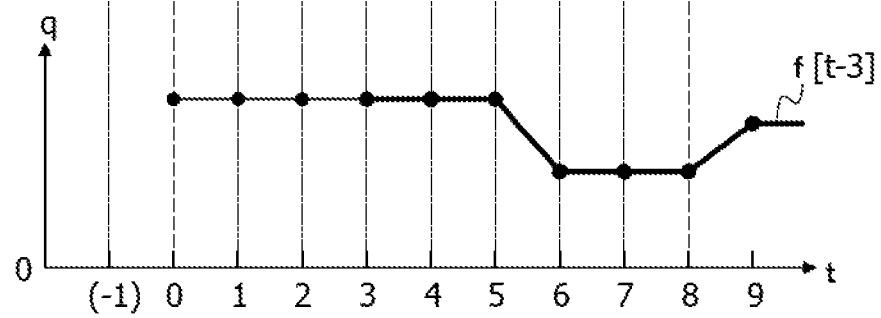

On the other hand, when a second feature amount regarding the time series signal $f[t-s]$ obtained by shifting the time series signal $f[t]$ by +s frames, the second feature amount generation unit 123 calculates the second feature amount by adding the pixel average value where 0≤t<(t−s). For example, in the time series signal $f[t-3]$ obtained by shifting the time series signal $f[t]$ by +3 frames, an average pixel value k=0 in regard to frames corresponding to time t=0, 1, and 2 as illustrated in FIG. 9C. It is to be noted that, where an average pixel value in regard to the frames corresponding to time t=0, 1, and 2 in the time series signal $f[t+3]$, for example, a value substantially equal to an average pixel value regarding a frame corresponding to time t=0 in the time series signal $f[t]$ may be added as illustrated in FIG. 9D.

FIG. 10 depicts views illustrating a generation method of a second feature amount. FIG. 11 is a view illustrating generated second feature amounts.

Figure 10A:
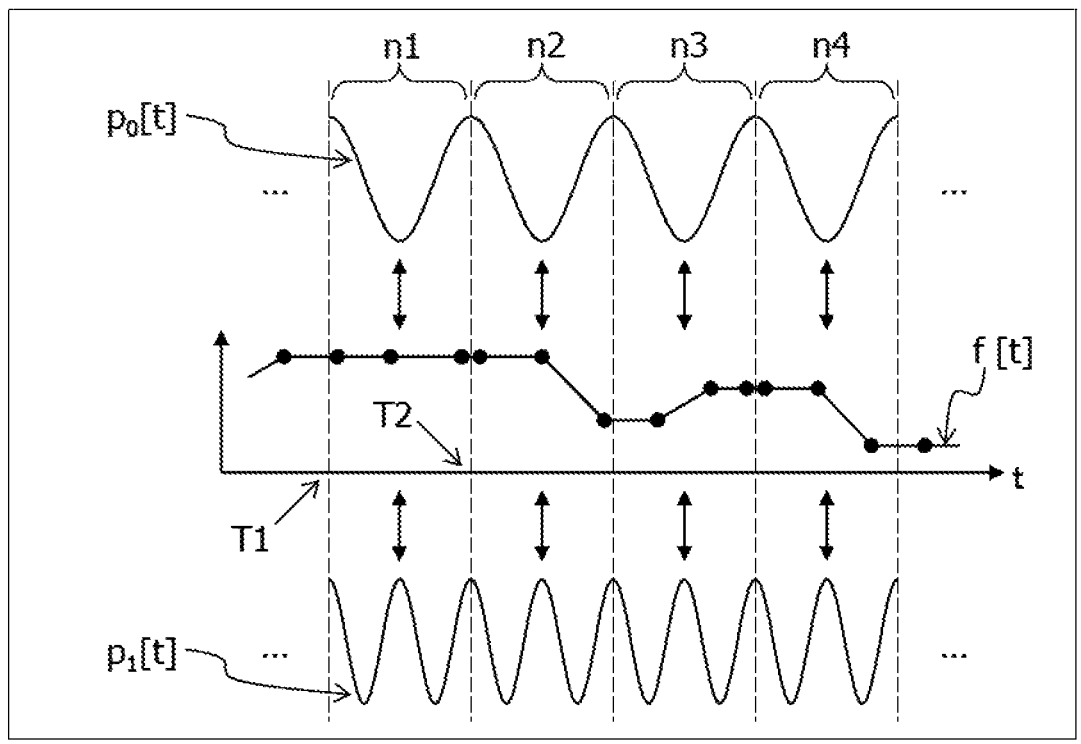
FIGS. 10A and 10B depict views illustrating a generation method of a second feature amount.

FIG. 10A illustrates a generation method (calculation method) of a second feature amount regarding the time series signal f[t] generated by the time series signal generation unit 122. The axis t of abscissa of a graph of FIG. 10A indicates time, and time T1 and time T2 represent points of time of reproduction of a top frame in sections n1 and n2 when moving image data is divided into sections of every eight frames, respectively.

As the second feature amount regarding the time series signal f[t], the second feature amount generation unit 123 divides the time series signal f[t] for each time length corresponding to eight frames and calculates, for each section, a correlation value with the signal pattern $p_0[t]$ of the bit 0 and a correlation value with the signal pattern $p_1[t]$ of the bit 1.

Figure 10B:
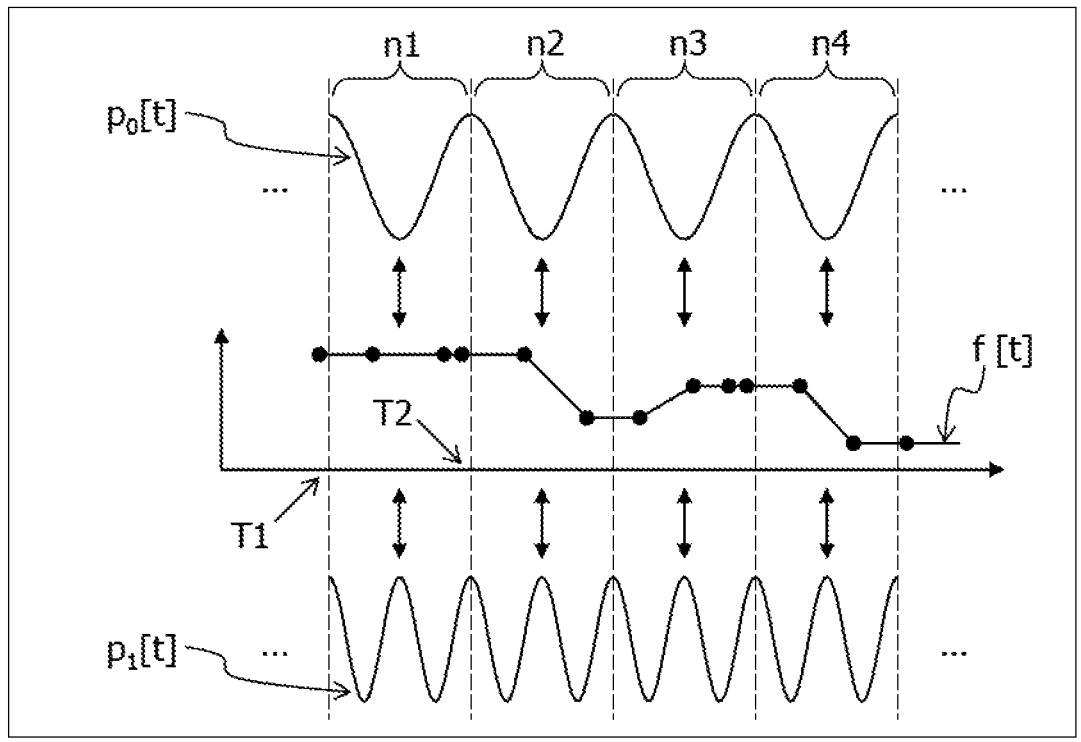

In the meantime, FIG. 10B illustrates a generation method (calculation method) of the second feature amount in regard to the time series signal f[t+2] obtained by shifting the time series signal f[t+1] by −2 frames. The axis t of abscissa of a graph of FIG. 10B indicates time, and time T1 and time T2 represent points of time of reproduction of a frame at the top in sections n1 and n2 when the moving image data is divided into sections of every eight frames, respectively.

When a second feature amount regarding the time series signal f[t+2], the second feature amount generation unit 123 excludes average pixel values at t=0 and t=1 of the time series signal f[t] as described above. For example, the second feature amount generation unit 123 divides the time series signal f[t+2] (t+2≥0) into sections of each time length of eight frames and calculates, for each section, a correlation value with the signal pattern $p_0[t]$ of the bit 0 and a correlation value with the signal pattern $p_1[t]$ of the bit 1. In this manner, the section within which correlation values with the basic signal patterns $p_0[t]$ and $p_1[t]$ in the time series signal f[t+2] are calculated and the section within which correlation values with the basic signal patterns $p_0[t]$ and $p_1[t]$ are calculated are displaced by two frames from each other.

The correlation value $rf_0[n,s]$ between the nth section of the time series signal f[t−s] and the signal pattern $p_0[t]$ of the bit 0 is calculated in accordance with the expression (3-1) given below. Meanwhile, the correlation value $rf_1[n,s]$ between the nth section of the time series signal f[t−s] and the signal pattern $p_1[t]$ of the bit 1 is calculated in accordance with the expression (3-2) given below.

$$rf_0[n,s] = \sum_{t=8n}^{8n+7} f[t-s] \times p_0[t] \quad (3\text{-}1)$$

$$rf_1[n,s] = \sum_{t=8n}^{8n+7} f[t-s] \times p_1[t] \quad (3\text{-}2)$$

If FIGS. 10A and 10B are compared with each other, the variation patterns of an average pixel value within a section n1 between time T1 to time T2 are substantially equal. Therefore, the correlation values $rf_0[n1,-2]$ and $rf_1[n1,-2]$ in the section n1 of the time series signal f[t+2] are substantially equal in value with the correlation values $rf_0[n1,0]$ and $rf_1[n1,0]$ regarding the section n1 of the time series signal f[t] (s=0), respectively.

On the other hand, in the other sections n2, n3, and n4, a difference (displacement) by two frames appears with the variation pattern of the average pixel value. Therefore, for example, the combination of the correlation values $rf_0[n2,-2]$ and $rf_1[n2,-2]$ regarding the section n2 of the time series signal f[t+2] is different from the combination of the correlation values $rf_0[n2,-2]$ and $rf_1[n2,-2]$ regarding the section n2 of the time series signal f[t].

If the correlation value $rf_0[n,s]$ with the signal pattern $p_0[t]$ of the bit 0 within the nth section of the time series signal f[t−s] and the correlation value $rf_1[n,s]$ with the basic signal pattern $p_1[t]$ are calculated in this manner, such a result as indicated by a table 412 illustrated in FIG. 11 is obtained.

After the second feature amount generation unit 123 calculates the correlation values $rf_0[n,s]$ and $rf_1[n,s]$ in regard to all time series signals f[t−s] within the designated shift range, the second feature amount generation unit 123 transmits the correlation values $rf_0[n,s]$ and $rf_0[n,s]$ as second feature amounts to the fine adjustment unit 124. After the second feature amount generation unit 123 transmits the second feature amounts to the fine adjustment unit 124, the process at step S5 ends.

After the process at step S5 ends, the digital watermark embedded apparatus 1 performs a process for finely adjusting the moving image data by the fine adjustment unit 124 (step S6). The fine adjustment unit 124 performs, as the process at step S6, a process, for example, illustrated in FIG. 12.

Figure 12:
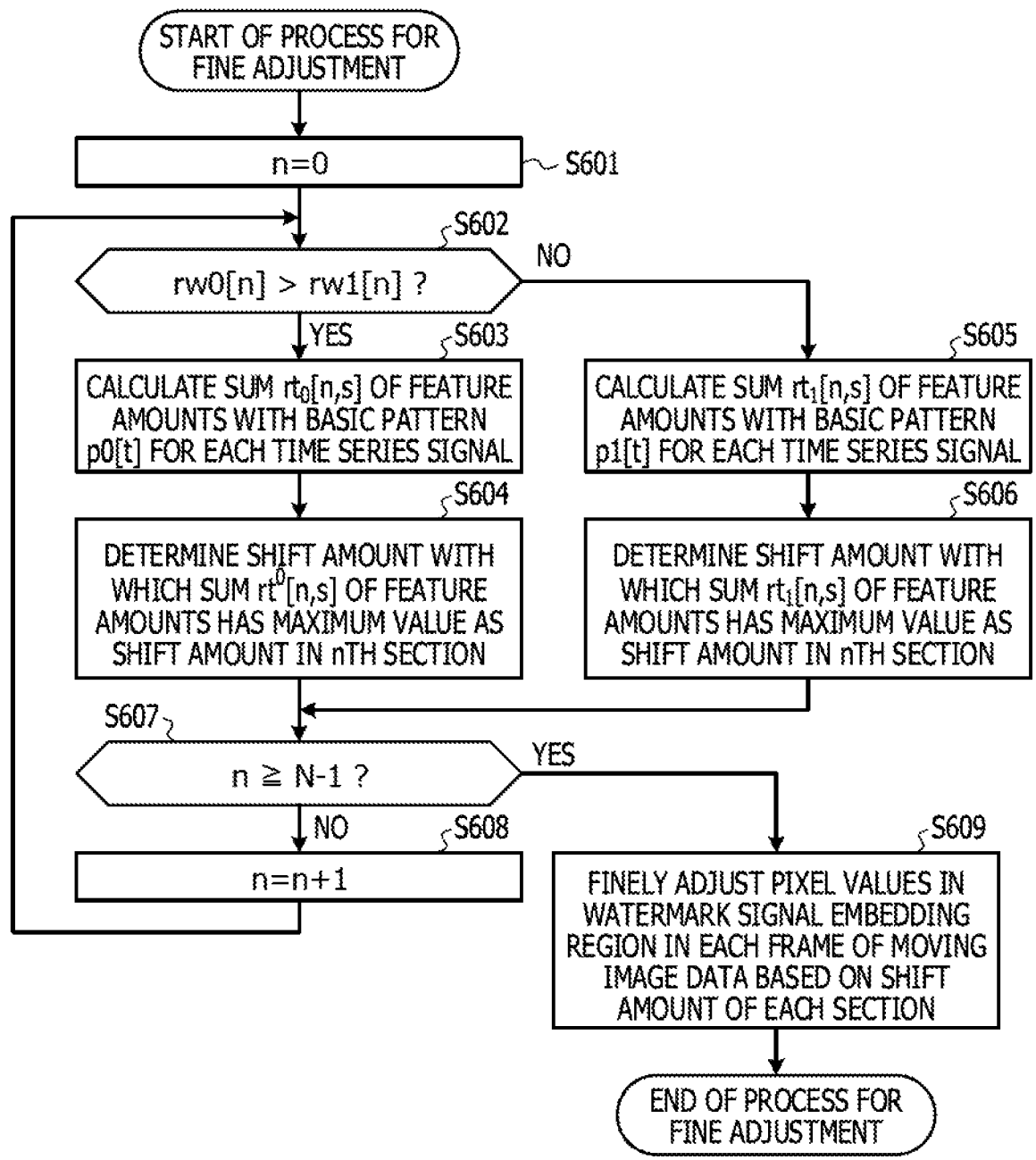
FIG. 12 is a flow chart illustrating a substance of a process for finely adjusting moving image data according to the first embodiment.

FIG. 12 is a flow chart illustrating a substance of a process for finely adjusting moving image data according to the first embodiment.

The fine adjustment unit 124 first initializes the variable n, which designates a section for each eight frames of the moving image data to n=0 (step S601).

Then, the fine adjustment unit 124 decides whether or not the first feature amounts $rw_0[n]$ and $rw_1[n]$ corresponding to the nth section of the moving image data satisfy $rw_0[n] > rw_1[n]$ (step S602).

The first feature amounts are correlation values between the signal pattern in the nth section of the watermark signal w[t] and the reference signal patterns $p_0[t]$ and $p_1[t]$. Further, of the first feature amounts $rw_0[n]$ and $rw_1[n]$ within the nth section, one is 4A[n] and the other is 0. Therefore, if $rw_0[n] > rw_1[n]$ (step S602: YES), the signal pattern in the nth section of the watermark signal w[t] is the signal pattern $p_0[t]$ of the bit 0. Accordingly, if $rw_0[n] > rw_1[n]$, the fine adjustment unit 124 next calculates the sum $rt_0[n,s]$ of the first feature amount in the nth section and the signal pattern of the bit 0 in the second feature amount (step S603). At step S603, the fine adjustment unit 124 calculates the sum $rt_0[n,s]$ of the correlation values for each time series signal f[t−s] in accordance with the following expression (4-1).

$$rt_0[n,s] = rw_0[n] + rf_0[n,s] \quad (4\text{-}1)$$

After step S603, the fine adjustment unit 124 determines the shift amount s with which the calculated sum $rt_0[n,s]$ of the correlation values indicates a maximum value as the shift amount for the nth section of the moving image data (time series signal) (step S604).

In contrast, if $rw_0[n] < rw_1[n]$ (step S602: NO), the signal pattern in the nth section of the watermark signal w[t] is the reference signal pattern $p_1[t]$ of the bit 1. Accordingly, where $rw_0[n] < rw_1[n]$, the fine adjustment unit 124 subsequently calculates the sum $rt_0[n,s]$ of the correlation values between the first feature amount and the signal pattern of the bit 1 of the second feature amount in the nth section (step S605). At step S605, the fine adjustment unit 124 calculates the sum $rt_1[n,s]$ of correlation values for each time series signals f[t−s] in accordance with the expression (4-2) given below.

$$rt_1[n,s] = rw_1[n] + rf_1[n,s] \quad (4\text{-}2)$$

After step S605, the fine adjustment unit 124 determines the shift amount s with which the calculated sum $rt_1[n,s]$ of the correlation values indicates a maximum value as the shift amount for the nth section of the moving image data (step S606).

After a shift amount for the nth section of the moving image data is determined at step S604 or S606, the fine adjustment unit 124 decides whether or not n≥N−1 is satisfied (step S607). Here, the value N is a total number of sections when the moving image data is divided into sections for each eight frames. If n<N−1 (step S607: No), the fine adjustment unit 124 updates the variable n to n+1 (step S608) and repeats the processes at the steps beginning with step S602.

On the other hand, if n≥N−1 is satisfied (step S607: Yes), the fine adjustment unit 124 subsequently performs fine adjustment of pixel values in the watermark signal embedding region of each frame of the moving image data based on the shift amount determined for each section (step S609).

After the process at step S609 ends, the fine adjustment unit 124 transmits the moving image data whose pixel values are finely adjusted to the watermark signal embedding unit 130. After the fine adjustment unit 124 transmits the moving image data to the watermark signal embedding unit 130, the process for finely adjusting the moving image data at step S6 ends.

Figure 13:
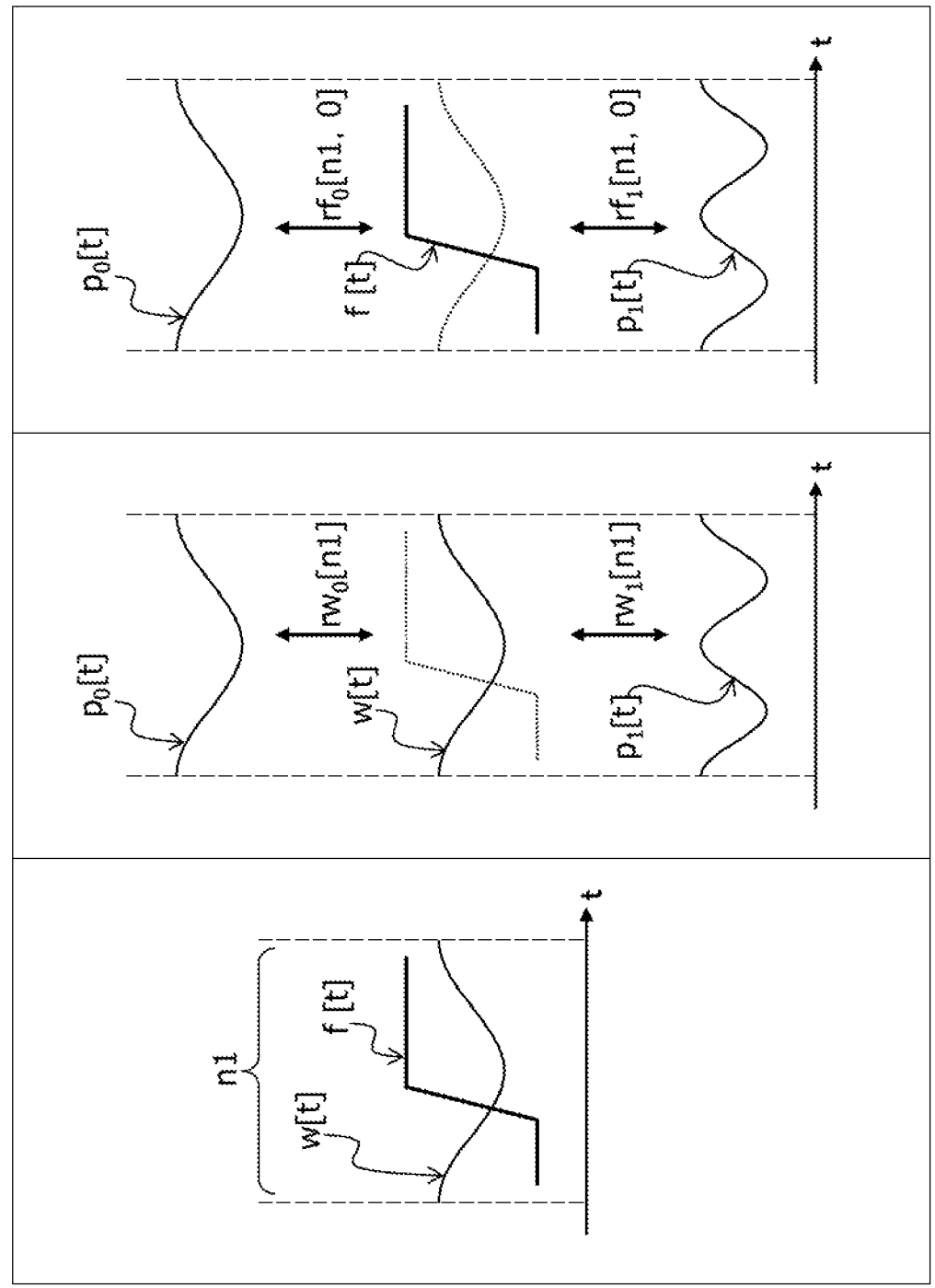
FIGS. 13A, 13B, and 13C depict views illustrating a correlation between a time series signal and a basic signal pattern.

FIG. 13 depicts views illustrating a correlation between a time series signal and a basic signal pattern. FIG. 14 is a view illustrating a result of bit decision of a watermark signal within a section depicted in FIG. 13A.

FIG. 13A illustrates a signal pattern of the watermark signal w[t] to be embedded into moving image data and a variation pattern of the time series signal f[t] within a section n1 of the moving image data.

The signal pattern of the watermark signal w[t] within the section n1 is a cosine wave having one cycle given by the section n1. For example, as depicted in FIG. 13B, of the signal pattern of the watermark signal w[t] within the section n1, the correlation with the basic signal pattern $p_0[t]$ of the bit 0 is very high while the correlation with the basic signal pattern $p_1[t]$ of the bit 1 is very low. Therefore, as the first feature amount within the section n1, the correlation value $rw_0[n1]$ with the signal pattern $p_0[t]$ of the bit 0 is $rw_0[n1]=4A[n1]$ and the correlation value $rw_1[n1]$ with the signal pattern $p_1[t]$ of the bit 1 is $rw_1[n1]=0$.

Meanwhile, in the variation pattern of the time series signal f[t] within the section n1, for example, the average signal values corresponding to the first to third frames in the time series order within the section n1 are substantially equal to each other. Further, within the section n1, the average pixel value corresponding to the fourth frame is higher than the average pixel values corresponding to the first to third frames. Furthermore, within the section n1, the average pixel values corresponding to the fourth to eighth frames in the time series order are substantially equal to each other. For example, if the variation pattern of the time series signal f[t] and the basic signal pattern $p_0[t]$ of the bit 0 within the section n1 are compared with each other, as depicted in FIG. 13C, within a section within which the value of the time series signal f[t] increases, the value of the signal pattern $p_0[t]$ decreases. In contrast, if the variation pattern of the time series signal f[t] and the signal pattern $p_1[t]$ of the bit 1 within the section n1 are compared with each other, within a section within which the value of the signal pattern $p_1[t]$ increases, also the value of the signal pattern $p_1[t]$ increases.

From the foregoing, the first feature amount and the second feature amount within the section n1 illustrated in FIG. 13A have such values as indicated in a table 413 of FIG. 14. Of the correlation value (first feature amount) regarding a watermark signal embedded in moving image data, the correlation value $rw_0[n1]$ with the signal pattern of the bit 0 is 100 and the correlation value $rw_1[n1]$ with the signal pattern of the bit 1 is 0. Therefore, if the bits in the section n1 are decided only based on the pattern of the watermark signal w[t], they are "0," and the bit information from the embedded watermark signal w[t] is extracted correctly.

However, of the correlation value (second feature amount) regarding the variation pattern of the time series signal f[t], as depicted in FIG. 14, the correlation value $rf_0[n1]$ with the signal pattern of the bit 0 is 100. However, the correlation value $rf_1[n1]$ with the signal pattern of the bit 1 is 400. Therefore, if the bit decision within the section n1 is performed only based on the correlation value (second feature amount) of the variation pattern within the section n1 of the time series signal f[t], the decision result is "1" and is a decision result opposite to the embedded watermark signal w[t].

Here, if the sums $rt_0[n1,s]$ and $rt_1[n1,s]$ of the coordinate values of the time series signal f[t] in which the watermark signal w[t] is embedded are calculated using the expressions (4-1) and (4-2), the sums become $rt_0[n1,s]=200$ and $rt_1[n1,s]=400$, respectively. Therefore, also where bit decision within the section n2 is performed based on the sums $rt_0[n1,s]$ and $rt_1[n1,s]$ of the correlation values, the decision result is "1" and an error occurs with the bit information. For example, where the watermark signal w[t] is embedded into moving image data, there is the possibility that erroneous bit information (watermark information) may be detected from the watermark signal embedded in the moving image data by an influence of the time variation of pixel values of the moving image data itself.

In contrast, if a time series signal generated from moving image data is shifted in a time axis direction within a given range as in the present embodiment, the relationship between the time series signal f[t−s] after shifted and the basic signal patterns $p_0[t]$ and $p_1[t]$ is such as described below.

Figure 15:
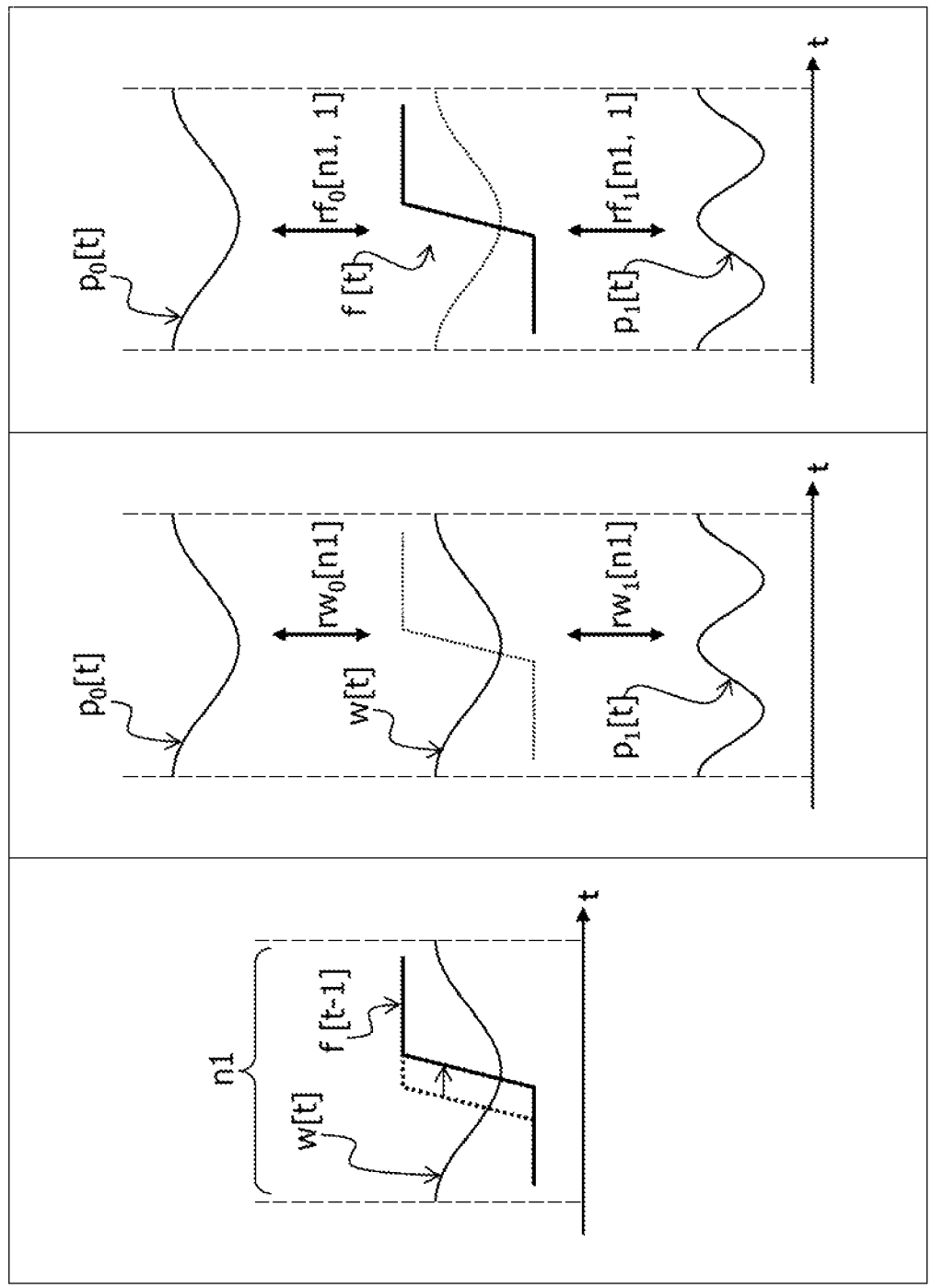
FIGS. 15A, 15B, and 15C depict views illustrating a correlation between a time series signal and a basic signal pattern when the time series signal is shifted.

FIG. 15 depicts views illustrating a correlation between a time series signal and a basic signal pattern when the time series signal is shifted. FIG. 16 is a view illustrating a result of bit decision of a watermark signal within a section illustrated in FIG. 15A.

In FIG. 15A, a signal pattern of a watermark signal w[t] in which moving image data is embedded and a variation pattern of a time series signal f[t−1] obtained by shifting a time series signal f[t] by +1 frame within a section n1 of the moving image data are illustrated. The variation pattern of a dotted line in FIG. 15A is a variation pattern of the time series signal f[t] illustrated in FIG. 13A.

The signal pattern of the watermark signal w[t] within the section n1 is a cosine wave having one cycle given by the section n1. For example, as depicted in FIG. 15B, of the signal pattern of the watermark signal w[t] within the section n1, the correlation with the basic signal pattern $p_0[t]$ of the bit 0 is very high while the correlation with the basic signal pattern $p_1[t]$ of the bit 1 is very low. Therefore, as the first feature amount within the section n1, the correlation value $rw_0[n1]$ with the signal pattern $p_0[t]$ of the bit 0 is $rw_0[n1]=4A[n1]$ and the correlation value $rw_1[n1]$ with the signal pattern $p_1[t]$ of the bit 1 is $rw_1[n1]=0$.

Meanwhile, in the variation pattern of the time series signal f[t] within the section n1, for example, the average signal values corresponding to the first to fourth frames in the time series order within the section n1 are substantially equal to each other. Further, within the section n1, the average pixel value corresponding to the fifth frame is higher than the average pixel values corresponding to the first to fourth frames. Furthermore, within the section n1, the average pixel values corresponding to the fifth to eighth frames in the time series order are substantially equal to each other. If the variation pattern of the time series signal f[t−1] and the basic signal pattern $p_0[t]$ within the section n1 are compared with each other, within a section within which the value of the time series signal f[t−1] increases, the basic signal pattern $p_0[t]$ of the bit 0 exhibits a change from decrease to increase as illustrated in FIG. 15C. In contrast, if the variation pattern of the time series signal f[t] and the basic signal pattern $p_1[t]$ of the bit 1 within the section n1 are compared with each other, within a section within which the time series signal f[t−1] increases, the basic signal pattern $p_1[t]$ exhibits a change from increase to decrease.

From the foregoing, the first feature amount and the second feature amount within the section n1 illustrated in FIG. 15A have such values as indicated in a table 414 of FIG. 16. Of the correlation value (first feature amount) regarding a watermark signal embedded in moving image data, the correlation value $rw_0[n1]$ with the signal pattern $p_0[t]$ of the bit 0 is 100 and the correlation value $rw_1[n1]$ with the signal pattern $p_1[t]$ of the bit 1 is 0. Therefore, if the bits in the section n1 are decided only based on the variation pattern of the watermark signal w[t] within the section n1, they are "0," and the bit information is restored correctly from the embedded watermark signal w[t].

Further, of the correlation value (second feature amount) regarding a variation pattern of the time series signal f[t−1], as depicted in FIG. 16, the correlation value $rf_0[n1]$ with the signal pattern $p_0[t]$ of the bit 0 is 400 and the correlation value $rf_1[n1]$ with the signal pattern $p_1[t]$ of the bit 1 is 0. Therefore, if the bits in the section n1 are decided only based on the correlation value (second feature amount) of the variation pattern of the time series signal f[t] within the section n1, they are "0," and a decision result same as the embedded watermark signal w[t] is obtained.

Therefore, if the sums $rt_0[n1,s]$ and $rt_1[n1,s]$ of the correlation values in the time series signal in which a watermark pattern are calculated, the sum $rt_0[n1,s]=500$ and the sum $rt_1[n1,s]=0$ are obtained. Therefore, if the bits in the section n1 are decided based on the sums $rt_0[n1,s]$ and $rt_1[n1,s]$ of the correlation values, the decision result is "0," and the bit information is reproduced correctly from the watermark signal w[t].

In this manner, by shifting the time series signal f[t] in the time axis direction, it is possible to change the relationship in magnitude between the sums $rt_0[n1,s]$ and $rt_1[n1,s]$ of the correlation values with the basic signal patterns in the time series signal in which the watermark signal w[t] is embedded. Therefore, by shifting the time series signal f[t] based on the basic signal patterns $p_0[t]$ and $p_1[t]$ of the watermark signal w[t] within the section n1 such that the correlation with the basic signal pattern increases, it is possible to suppress erroneous decision when bit information is restored from the watermark signal w[t]. For example, the digital watermark embedded apparatus 1 according to the present embodiment performs, before a watermark signal is embedded into moving image data, prediction of the possibility that the watermark signal embedded in the moving image data may be detected in error based on the first feature amount and the second feature amount. Then, when the possibility that the watermark signal may be detected in error is high, the digital watermark embedded apparatus 1 finely adjusts the pixel value of pixels of the moving image data such that the possibility of erroneous detection may be minimized. Therefore, according to the present embodiment, it is possible to suppress the information included in the moving image data itself from making noise when the watermark signal is to be detected. Thus, according to the present embodiment, it is possible to reduce erroneous detection of a watermark signal, and the detection accuracy of a watermark signal is improved. Further, the digital watermark embedded apparatus 1 according to the present embodiment finely adjusts the pixel values of pixels of the moving image data in the time axis direction within the given time range. Therefore, according to the present embodiment, it is possible to improve the detection accuracy of a watermark signal while suppressing deterioration of the picture quality caused by adjustment (change) of pixel values.

Figure 17A:
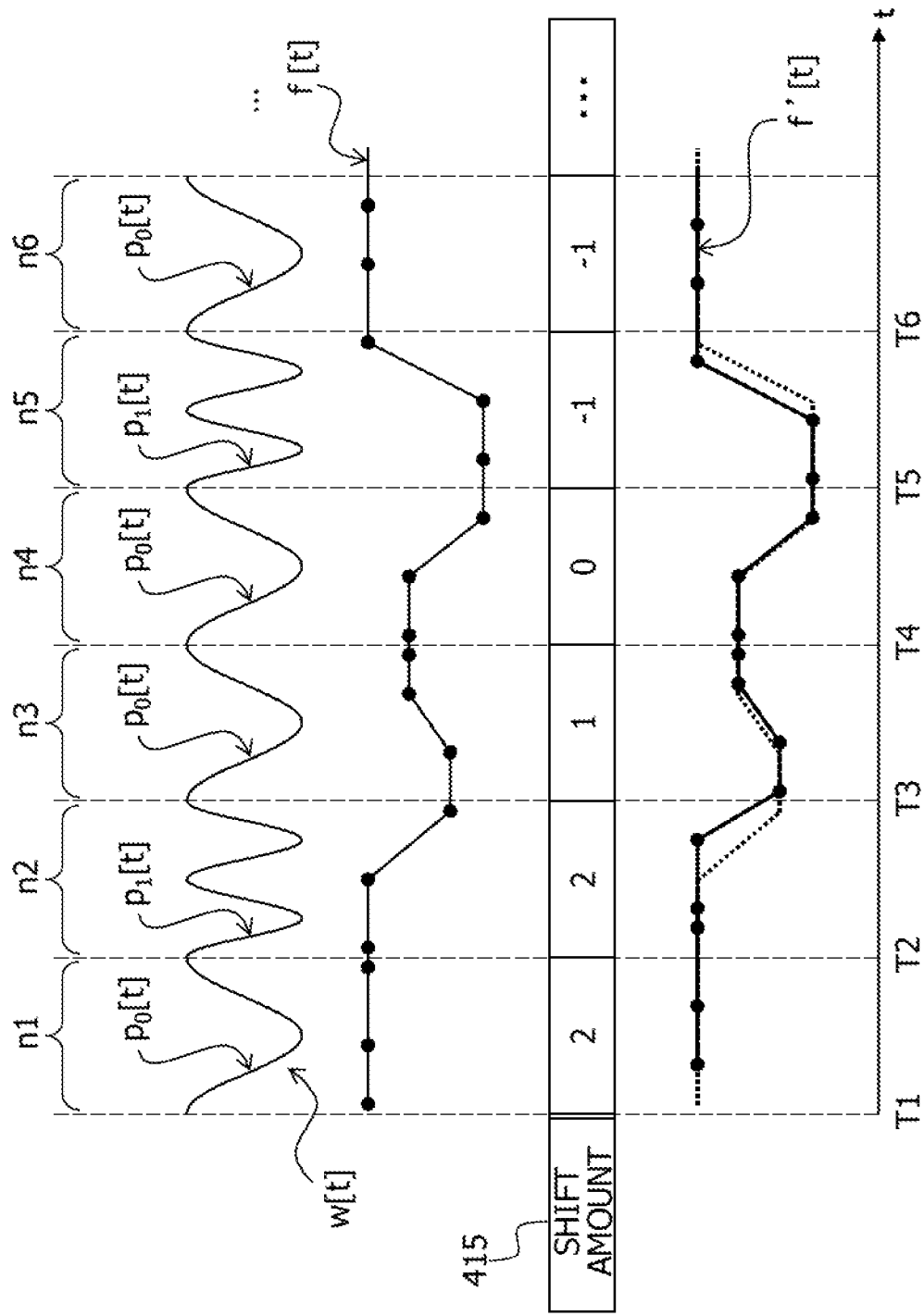
FIG. 17A is a view (part 1) illustrating an example of a method for fine adjustment of moving image data.

FIG. 17A is a view (part 1) illustrating an example of a method for fine adjustment of moving image data. FIG. 17B is a view (part 2) illustrating an example of a method for fine adjustment of moving image data.

FIG. 17A illustrates a table 415 representative of shift amounts in sections determined based on a watermark signal w[t] and a time series signal f'[t] finely adjusted based on the shift amounts in the sections. In the table 415 of FIG. 17A, the shift amount in the first two sections n1 and n2 is +2 frames. Accordingly, the fine adjustment unit 124 performs fine adjustment of replacing average pixel values of the frames in the sections n1 and n2 into average pixel values in the time series signal f[t−2] obtained by shifting the time series signal f[t] by +2.

Further, in the table of FIG. 17A, the shift amount in the section n3 is +1 frame. Accordingly, the fine adjustment unit 124 performs fine adjustment of average pixel values of the frames in the section n3 into average pixel values in the time series signal f[t−1] obtained by shifting the time series signal f[t] by +1 frame.

Further, in the table of FIG. 17A, the shift amounts of the sections n5 and n6 are −1 frame. Accordingly, the fine adjustment unit 124 performs fine adjustment of replacing average pixel values of frames in the sections n5 and n6 into average pixel values in the time series signal f[t+1] obtained by shifting the time series signal f[t] by −1 frame.

It is to be noted that, in any section in which the shift amount is 0 like the section n4 in the table of FIG. 17A, the average pixel value in the time series signal f[t] may be used as it is.

After the average pixel value in each frame is finely adjusted based on the shift amount in each section in this manner, the fine adjustment unit 124 performs fine adjustment of the moving image data based on a time series signal f'[t] representative of a time variation of the average pixel value after the fine adjustment. For example, the fine adjustment unit 124 finely adjusts the pixel value of pixels in a watermark signal embedding region in each frame of the moving image data based on the difference between the average pixel value of the time series signal f[t] before the fine adjustment and the average pixel value of the time series signal f'[t] after the fine adjustment.

For example, FIG. 17B illustrates the time series signal f[t] before fine adjustment and the time series signal f'[t] after the fine adjustment in the sections n2 and n3 in FIG. 17A. It is to be noted that, in FIG. 17B, the time series signal f[t] before the fine adjustment is indicated by a thick dotted line and the time series signal f'[t] after the fine adjustment is indicated by a thick solid line.

The axis t of abscissa in the graph of FIG. 17B indicates time, and time T2 represents a point of time of reproduction of the first frame in the time series order from among frames included in the section n2 in the moving image data. For example, time T2 in the graph of FIG. 17B represents the (8×n2)th frame in the time series order from among all frames of the moving image data. Similarly, time T3 and time T4 in the graph of FIG. 17B represent the (8×n3)th frame and the (8×n4)th frame in the time series order among all frames of the moving image data, respectively.

In the section n2 illustrated in FIG. 17B, fine adjustment for shifting the time series signal f[t] by +2 frames is performed. However, for example, in the third frame in the section n2 ((8×n2+2)th frame in the time series order from among all frames), the average pixel values before and after the fine adjustment are substantially equal to each other. For a frame in which the average pixel values before and after fine adjustment are substantially equal to each other in this manner, the fine adjustment unit 124 does not perform fine adjustment for pixel values in any the watermark signal embedding region.

On the other hand, for example, in the sixth frame in the section n2 ((8×n2+5)th frame in the time series order from among all frames), the average pixel value increases by fine adjustment. For a frame in which the average pixel value increases after fine adjustment in this manner, the fine adjustment unit 124 performs fine adjustment for increasing pixel values in the watermark signal embedding region based on an increasing amount of an average pixel value after fine adjustment from that before and after fine adjustment or average pixel values after fine adjustment, for example.

Further, for example, in the fifth frame in the section n3 ((8×n3+4)th frame in the time series order from among all frames), the average pixel value decreases by fine adjustment. For a frame in which the average pixel value decreases after fine adjustment in this manner, the fine adjustment unit 124 performs fine adjustment for decreasing the pixel values in the watermark signal embedding region based on an amount of decrease of the average pixel value after fine adjustment from that before and after fine adjustment or the average pixel value after fine adjustment, for example.

After fine adjustment of the moving image data is performed by the process described above, the digital watermark embedded apparatus 1 performs a process for embedding the watermark signal w[t] into the moving image data after fine adjustment by the watermark signal embedding unit 130 (step S7). The watermark signal embedding unit 130 embeds the watermark signal into the watermark signal embedding region of moving image data after fine adjustment in accordance with an embedded method of a watermark signal known already. The watermark signal w[t] is a signal in which a basic signal pattern $p_0[t]$ of the bit 0 and a basic signal pattern $p_1[t]$ of the bit 1 are coupled illustrated in FIG. 3. When the signal pattern $p_0[t]$ of the bit 0 is embedded into a frame of a section n of the moving image data, the watermark signal embedding unit 130 rewrites the pixel values in the watermark signal embedding region of each frame based on a value corresponding to reproduction time of each frame in the section n of the signal pattern $p_0[t]$. On the other hand, when the signal pattern $p_1[t]$ of the bit 1 is embedded into frames in the section n of the moving image data, the pixel values in the watermark signal embedding region of each frame are rewritten based on values corresponding to reproduction time points of the frames in the sections n of the pattern $p_1[t]$ in the watermark signal embedding unit 130.

The digital watermark embedded apparatus 1 according to the present embodiment finely adjusts pixel values of each frame of moving image data in the time axis direction so as to increase the correlation with a pattern of a watermark signal to be embedded for each section of a unit of eight frames of the moving image data as described hereinabove. Therefore, when a watermark signal is extracted from moving image data to restore watermark information, it is possible to reduce erroneous restoration of the watermark information caused by increase of the correlation between a variation pattern of a pixel value in the moving image data and a basic signal pattern opposite to the watermark signal. For example, according to the present embodiment, by finely adjusting, before a watermark signal is embedded into moving image data, the pixel values in each frame of the movement image data in the time axis direction such that the possibility that the watermark signal may be detected in error may be minimized, the detection accuracy of the watermark signal may be improved. The embedded method of a digital watermark according to the present embodiment is suitable particularly to embed a watermark signal into moving image data of a short period of time into which it is difficult to embed a same watermark signal by a plural number of times into different time sections from each other of the moving image data. However, the digital watermark embedded method according to the present embodiment may naturally be applied irrespective of the combination of the substance of a moving image (figure reflected in a moving image displayed when reproduced or a reproduction time period) and a time length of the watermark signal.

Further, when pixel values in each frame of moving image data are finely adjusted in the time axis direction, by restricting the range for adjustment, it is possible to reduce error in restoration of watermark information while deterioration of the picture quality when moving image data is reproduced is suppressed.

It is to be noted that, while the present embodiment is directed to an example in which moving image data is divided into sections for each eight frames and a watermark signal is embedded into the sections of the moving image data, the one section of the moving image data may be eight frames and may be a different frame number. Further, the basic signal patterns to be used for generation of a watermark signal w[t] may be the combination of the basic signal pattern $p_0[t]$ depicted in FIG. 3A and the basic signal pattern $p_1[t]$ depicted in FIG. 3B and may be changed suitably.

Further, the processes at steps S602 to S606 in the flow chart of FIG. 12 are nothing but an example of a process for determining a shift amount based on the first feature amount and the second feature amount. The process for determining a shift amount may be the aforementioned processes and may be changed without departing from the subject matter of the present embodiment. For example, in the process for determining a shift amount, first, the sum $rt_0[n,s]$ of the correlation values for each time series signal f[t−s] may be calculated in accordance with the expression (4-1) and the sum $rt_1[n,s]$ of the correlation values for each time series signal f[t−s] may be calculated in accordance with the expression (4-2). In this case, if the section n of the watermark signal w[t] is the signal pattern $p_0[t]$ of the bit 0, the fine adjustment unit 124 determines a shift amount s with which, for example, $rt_0[n,s] > rt_0[n,s]$ is satisfied and besides the sum $rt_0[n,s]$ indicates a maximum value as the shift amount in the section n. On the other hand, if the section n of the watermark signal w[t] is the signal pattern $p_1[t]$ of the bit 1, the fine adjustment unit 124 determines a shift amount s with which, for example, $rt_1[n,s]>rt_0[n,s]$ is satisfied and besides $rt_1[n,s]$ indicates a maximum value as the shift amount in the section n.

Further, when moving image data is finely adjusted in accordance with the shift amount for each section determined based on the first feature amount and the second feature amount, the time series data of pixel values of pixels in the watermark signal embedding region of each frame may be shifted in the time axis direction to perform fine adjustment.

Further, the processes at steps S2 to S6 in the flow chart of FIG. 2 are nothing but an example of a process performed by the moving image data adjustment unit 120 of the digital watermark embedded apparatus 1 according to the present embodiment. The process performed by the moving image data adjustment unit 120 may be a process for determining a frame of moving image data at which overlapping of a watermark signal is to be started based on a variation of the value in the time axis direction of pixels in a region into which a watermark signal is to be embedded in each of a plurality of frames of moving image data and a feature of the watermark signal.

Further, although the digital watermark embedded apparatus 1 of FIG. 1 includes the watermark signal generation unit 110, the digital watermark embedded apparatus 1 according to the present embodiment may be the aforementioned apparatus and may be an apparatus from which the watermark signal generation unit 110 is omitted. The watermark signal w[t] to be embedded into moving image data may be generated by an information processing apparatus different from the digital watermark embedded apparatus 1 such as the first external apparatus 2. Where a watermark signal is generated by a different information processing apparatus, the digital watermark embedded apparatus 1 may hold information of the basic signal patterns $p_0[t]$ and $p_1[t]$ to be used for generation of the watermark signal w[t].

Second Embodiment

In the present embodiment, as another example of a method for determining a shift amount when moving image data is finely adjusted in the time axis direction, a determination method of a shift amount in which a dynamic programming (DP) method is used is described.

The functional configuration of the digital watermark embedded apparatus 1 according to the present embodiment may be same as the functional configuration of the digital watermark embedded apparatus 1 according to the first embodiment (refer to FIG. 1). Further, the digital watermark embedded apparatus 1 according to the present embodiment performs the processes at steps S1 to S7 described hereinabove in connection with the first embodiment (refer to FIG. 2). It is to be noted that the digital watermark embedded apparatus 1 according to the present embodiment performs, in the process for finely adjusting moving image data (step S6), a process in which a dynamic planning method hereinafter described is used is performed to determine a shift amount for each section (each frame) of moving image data.

Figure 18:
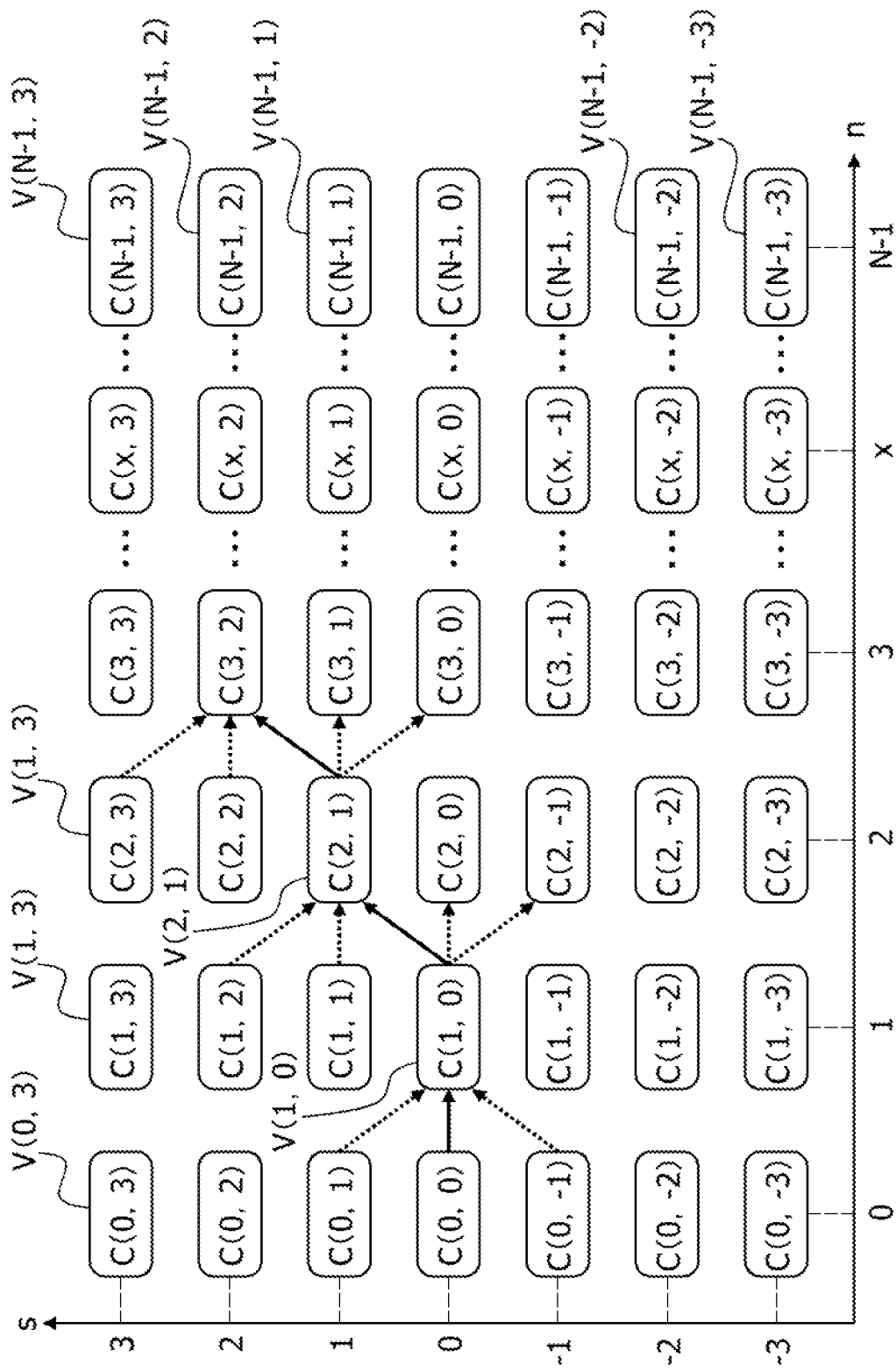
FIG. 18 is a view illustrating a determination method of a shift amount for moving image data using a dynamic planning method.

FIG. 18 is a view illustrating a determination method for a shift amount of moving image data in which a dynamic planning method is used.

The process for determining a shift amount of moving image data using a dynamic planning method is performed by the fine adjustment unit 124 of the digital watermark embedded apparatus 1. At this time, the fine adjustment unit 124 first calculates a transition cost C(n,s) when the time series signal f[t] is shifted by s frames in a section n as depicted in FIG. 18 based on a first feature amount, a second feature amount, and a watermark signal w[t]. It is to be noted that, in FIG. 18, the axis n of abscissa indicates a section of moving image data (time series signal) and the axis s of ordinate indicates a shift amount of the time series signal f[t]. Further, V(n,s) illustrated in FIG. 18 is a node representing the section n in the time series signal of the shift amount s.

The calculation expression of the cost C(n,s) of the node V(n,s) is switched, for example, in response to with which one of the signal pattern $p_0[t]$ and the signal pattern $p_1[t]$ in the section n of the watermark signal w[t] the section n of the time series signal f[t−s] has a higher correlation. For example, if the correlation value between the section n of the time series signal f[t−s] and the signal pattern $p_0[t]$ is higher than the correlation value between the section n of the time series signal f[t−s] and the signal pattern $p_1[t]$, the cost C(n,s) of the section n of the time series signal f[t−s] is calculated in accordance with an expression (5-1) given below. Meanwhile, if the correlation value between the section n of the time series signal f[t−s] and the signal pattern $p_1[t]$ is higher than the correlation value between the time series signal f[t−s] and the signal pattern $p_0[t]$, the cost C(n,s) of the section n of the time series signal f[t−s] is calculated in accordance with an expression (5-2) given below.

$$C(n,s)=(rw_1[n]+rf_1[n,s])-(rw_0[n]+rf_0[n,s])=(rf_1[n,s]-rf_0[n,s])-4A[n] \quad (5\text{-}1)$$

$$C(n,s)=(rw_0[n]+rf_0[n,s])-(rw_1[n]+rf_1[n,s])=(rf_0[n,s]-rf_1[n,s])-4A[n] \quad (5\text{-}2)$$

After the cost C(n,s) is calculated, the fine adjustment unit 124 next selects a candidate for an optimum route upon transition from the section n-1 to the section n based on the cost C(n,s) and the difference d (=s[n]−s[n−1]) in shift amount between the section n−1 and the section n.

FIG. 19 depicts views illustrating a selection method of a candidate for an optimum route.

Figure 19A:
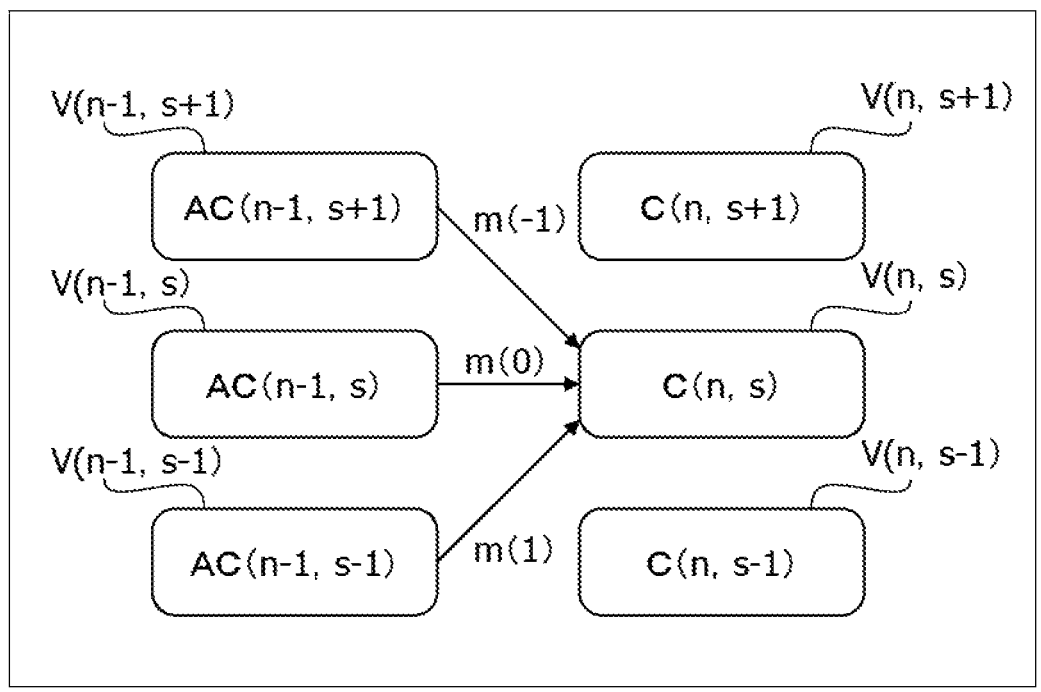
FIGS. 19A and 19B depict views illustrating a selection method of a candidate for an optimum route.
Figure 19B:
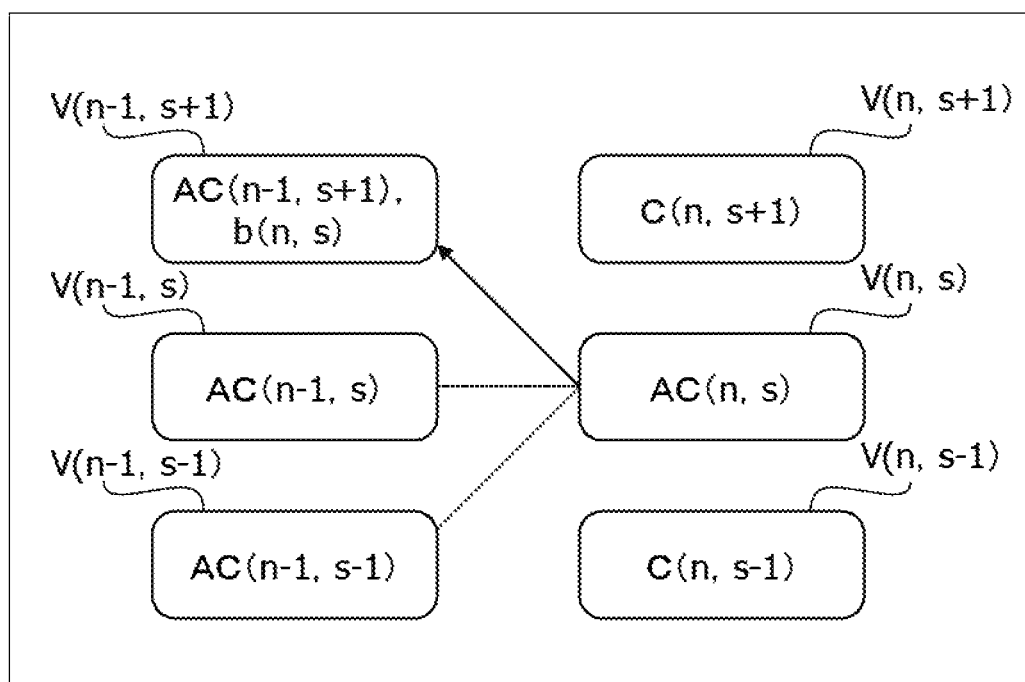

FIGS. 19A and 19B illustrate examples of the selection method of a candidate for an optimum route upon transition from the section n−1 to the section n.

In FIGS. 19A and 19B, a node V(n−1,s) represents the section n−1 in a time series signal f[t−s] shifted by s frames, and a node V(n,s) represents the section n in the time series signal f[t−s] shifted by s frames. Further, AC(n−1,s) of the node V(n−1,s) represents a cumulative cost, and where n−1=0, AC(n−1,s)=C(n−1,s) is satisfied.

A node V(n−1,s+1) represents the section n−1 of the time series signal f[t−(s+1)] shifted by s+1 frames, and another node V(n,s+1) represents the section n of the time series signal f[t−(s+1)] shifted by s+1 frames. Further, AC(n−1,s+1) of the node V(n−1,s+1) represents a cumulative cost, and where n−1=0, AC(n−1,s+1)=C(n−1,s+1) is satisfied.

The node V(n−1,s−1) represents the section n−1 of the time series signal f[t−(s−1)] shifted by s−1 frames, and the node V(n,s−1) represents the section n of the time series signal f[t−(s−1)] shifted by s−1 frames. Further, AC(n−1,s−1) of the node V(n−1,s−1) represents a cumulative cost, and in the case of n−1=0, AC(n−1,s−1)=C(n−1,s−1) is satisfied.

Where the shift range of the time series signal f[t] is ±s, since 2s+1 nodes V(n,s) are set in each section, there exist 2n+1 different routes to lead from the nodes in the section n−1 to one node V(n,s) in the section n. However, if the difference d in shift amount upon transition from the nodes in the section n−1 to one node in the section n increases, the amount of expansion or contraction of the time series signal on the boundary between the section n−1 and the section n increases and the influence upon the picture quality when the moving image data is reproduced increases. Therefore, in the present embodiment, a route leading to a node in the section n is set to a node of the section n−1 of the time series signal within a shift range of ±1 frame centered at the node in the section n. Accordingly, a candidate for an optimum route to the node V(n,s) illustrated in FIG. 19A is limited to the node V(n−1,s+1) of the shift amount s+1, the node V(n−1,s) of the shift amount s, and the node V(n−1,s−1) of the shift amount s−1 in the section n−1.

For example, in the present embodiment, the fine adjustment unit 124 selects a candidate for an optimum route to the node V(n,s) of the shift amount s in the section n from among the node V(n−1,s+1), the node V(n−1,s), and the node V(n−1,s−1) in accordance with the expression (6) given below.

$$AC(n, s) = \left\{ \begin{array}{l} AC(0, s) = C(0, s) \\ \min_{d=-1,0,1} [AC(n - 1, s - d) + m(d)] + C(n, s) \end{array} \right. \quad (6)$$

m(d) in the expression (6) is a difference in shift amount s upon transition from the section n−1 to the section n, and in the present embodiment, it is assumed that m(O)=0, m(1)=m(−1)=K (>0).

Here, for example, if the difference d in shift amount with which the calculation result AC(n,s) of the expression (6) for the node V(n,s) becomes minimum is d=−1, the fine adjustment unit 124 selects the node V(n−1,s+1) in the section n−1 as a candidate for an optimum route to the node V(n,s) in the section n. Therefore, the fine adjustment unit 124 calculates a back pointer b(n,s) representative of the node V(n−1,s+1) in the section n−1 on a route that passes the node V(n,s) in the section n in accordance with the expression (7) given below and associates the back pointer b(n,s) with the node V(n−1,s+1).

$$b(n, s) = s - \arg\min_{d=-1,0,1}[AC(n - 1, s - d) + m(d)] \quad (7)$$

The second term of the right side of the expression (7) is a function that returns a value (set) of d with which the value of [AC(n−1,s−d)+m(d)] is in the minimum from among the variable d (=−1, 0, 1).

For example, if the node V(n−1,s+1) in the section n−1 is selected as a candidate for an optimum route to the node V(n,s) in the section n, the fine adjustment unit 124 associates the back pointer b(n,s) with the node V(n−1,s+1) in the section n−1, as depicted in FIG. 19B. Further, the fine adjustment unit 124 replaces the cost C(n,s) of the node V(n,s) in the section n into the cumulative cost AC(n,s) calculated in accordance with the expression (6).

Further, although description is omitted in order to avoid repetitions, the fine adjustment unit 124 calculates a node that becomes a candidate for an optimum route in accordance with the expression (6) and associates the back pointer calculated in accordance with the expression (7) with the node similarly also in regard to the other nodes V(n,s+1), V(n,s−1) and so forth in the section n.

Thereafter, the fine adjustment unit 124 repeats the processes described above until after it selects a candidate for an optimum route in regard to each node in the last section (N−1th section) and associates the back pointer with the candidate for an optimum route.

After the fine adjustment unit 124 selects a candidate for an optimum route regarding each node in the last section (N−1th section) and associates the back pointer with the candidate for an optimum route, the fine adjustment unit 124 selects a node with which the cumulative cost is in the minimum from among the nodes in the last section. Thereafter, the fine adjustment unit 124 traces the nodes selected as candidates for an optimum route from the node with regard to which the cumulative cost is in the minimum in the last section toward the node of the first section based on the back pointers b(n,s). Then, the fine adjustment unit 124 determines the shift amount s of the time series signal at each node passed during the tracing as the shift amount in each section when moving image data is to be finely adjusted.

In this manner, in the present embodiment, the shift amount in each section when moving image data is to be finely adjusted is determined such that the cumulative cost may be minimized using a dynamic planning method. At this time, the digital watermark embedded apparatus 1 (fine adjustment unit 124) determines a route with regard to which the cumulative cost is minimized within a range within which the difference d between the shift amount in the section n−1 and the shift amount in the section n is ±1 frame. Therefore, the difference d between the shift amount in the section n−1 and the shift amount in the section n may be suppressed from becoming great. Thus, according to the present embodiment, erroneous restoration of watermark information may be reduced while the picture quality is suppressed from being deteriorated on the boundary between sections when moving image data is reproduced.

It is to be noted that the embedding process of a watermark signal according to the present embodiment may be performed for moving image data generated already and may be performed for moving image data being generated.

FIG. 20 depicts views illustrating a range within which an optimum route is searched for.

Figures 20A, 20B:
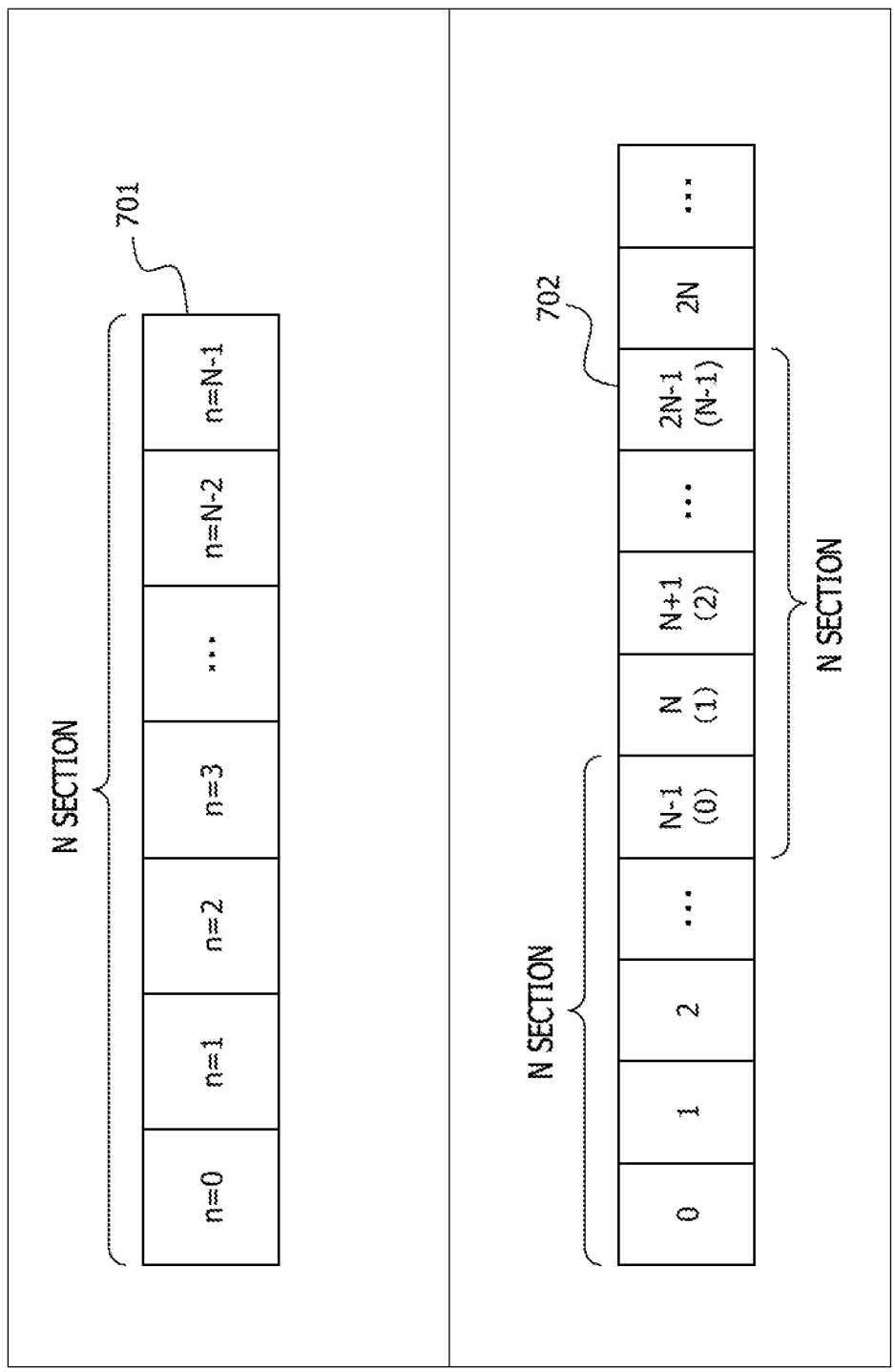

FIG. 20A illustrates N sections of moving image data 701 generated already. When the moving image data 701 generated already is searched for an optimum route, the number N of sections is determined already. Therefore, by successively performing a process for calculating a cumulative cost and a process for calculating and associating a back pointer with the cumulative cost from the top section (section of n=0) in the moving image data 701 toward the tail end section (section of n=N−1), one optimum route may be determined from within the entire moving image data 701.

Meanwhile, FIG. 20B illustrates moving image data 702 being generated such as a live video or the like being distributed on the real time basis. Where a watermark signal is to be embedded into the moving image data 702 that is being generated, the number of sections of the moving image data 702 increases together with time and the tail section varies every moment. Further, where a shift amount in each section of the moving image data 702 is calculated using a dynamic planning method, it is demanded to search for an optimum route in a large number of sections. Therefore, where a shift amount is to be calculated for the moving image data 702 being generated using a dynamic planning method, every time the number of sections generated in the moving image data 702 reaches a given section number N, a shift amount is calculated using a dynamic planning method for the N sections as depicted, for example, in FIG. 20B. In the example depicted in FIG. 20B, first at a point of time at which the number of sections generated in the moving image data 702 reaches N, a shift amount is calculated using a dynamic planning method for N sections from the top section (section of n=0) to the N−1th section. In the meantime, sections beginning with an Nth section are successively generated in the moving image data 702. Then, at a point of time at which the total number of sections generated in the moving image data 702 reaches 2N−1, a shift amount is calculated using a dynamic planning method now for N sections from the N−1th section to the 2N−1th section. At this time, the fine adjustment unit 124 uses the cumulative cost AC(N−1,s) calculated by the process in the preceding cycle as the cost C(N−1,s) regarding the N−1th section of each time series signal f[t−s]. Consequently, deterioration of the picture quality caused by increase of the difference between the shift amounts before and after the section N−1 may be suppressed.

The digital watermark embedded apparatus 1 that performs a process for embedding a digital watermark into moving image data described hereinabove in the foregoing description of the embodiments may be implemented, for example, by a computer and a program for being executed by the computer. In the following, the digital watermark embedded apparatus 1 implemented by a computer and a program is described with reference to FIG. 21.

FIG. 21 is a view depicting a hardware configuration of a computer.

As depicted in FIG. 21, a computer 9 includes a processor 901, a main storage apparatus 902, an auxiliary storage apparatus 903, an inputting apparatus 904, an outputting apparatus 905, an input/output interface 906, a communication controlling apparatus 907, and a medium driving apparatus 908. The components 901 to 908 of the computer 9 are coupled to each other by a bus 910 such that data may be passed between the components.

The processor 901 is a central processing unit (CPU), a micro processing unit (MPU) or the like. The processor 901 controls operation of the entire computer 9 by executing various programs including an operating system. Further, the processor 901 executes a program including a process for embedding a digital watermark into moving image data such as the processes illustrated in FIGS. 2 and 12 or the process for calculating an optimum route (shift amount) by a dynamic planning method described hereinabove in connection with the second embodiment.

The main storage apparatus 902 includes a read only memory (ROM) and a random access memory (RAM) not depicted. In the ROM of the main storage apparatus 902, a given basic control program that is read out by the processor 901, for example, upon activation of the computer 9 and so forth are recorded in advance. Meanwhile, the RAM of the main storage apparatus 902 is used as a working storage area as occasion demands when the processor 901 executes various programs. The RAM of the main storage apparatus 902 may be utilized, for example, as the adjustment method holding unit 125 in the digital watermark embedded apparatus 1 of FIG. 1. Further, the RAM of the main storage apparatus 902 may be utilized for storage of watermark information, a watermark signal, moving image data, first feature amounts, second feature amounts, finely adjusted moving image data, moving image data in which a watermark signal is embedded and so forth, and storage of a cost and so forth calculated in a dynamic planning method.

The auxiliary storage apparatus 903 is a storage apparatus having a greater storage capacity than the RAM of the main storage apparatus 902 such as a hard disk drive (HDD) or a nonvolatile memory (including a solid state drive (SSD)) such as a flash memory. The auxiliary storage apparatus 903 may be utilized for storage of various programs to be executed by the processor 901, various data and so forth. The auxiliary storage apparatus 903 may be utilized for storage of programs including, for example, the processes depicted in FIGS. 2 and 12, for storage of a program including a process for calculating an optimum route (shift amount) by a dynamic planning method and so forth, and for storage of an adjustment method of moving image data and so forth. Further, the auxiliary storage apparatus 903 may be utilized for storage of watermark information, a watermark signal, moving image data, first feature amounts, second feature amounts, finely adjusted moving image data, moving image data in which a watermark signal is embedded and so forth and for storage of a cost and so forth calculated in a dynamic planning method, for example.

The inputting apparatus 904 is, for example, a keyboard apparatus, a touch panel apparatus or a like apparatus. If an operator (user) of the computer 9 performs a given operation for the inputting apparatus 904, the inputting apparatus 904 transmits input information associated with the substance of the operation to the processor 901. The inputting apparatus 904 may be utilized to input, for example, an instruction for starting a process for embedding a watermark signal into moving image data, an instruction relating to a different process that may be executed by the computer 9 and so forth, to input various setting values and so forth.

The outputting apparatus 905 includes an apparatus such as a liquid crystal display unit or the like and a sound reproduction apparatus such as a speaker. The outputting apparatus 905 may be utilized, for example, as the second external apparatus 3 (refer to FIG. 1) that reproduces moving image data in which a watermark signal is embedded.

The input/output interface 906 couples the computer 9 and a different electronic apparatus to each other. The input/output interface 906 includes a connector, for example, of the universal serial bus (USB) standard. The input/output interface 906 may be utilized for coupling, for example, between the computer 9 and an image pickup apparatus for picking up a moving image.

The communication controlling apparatus 907 is an apparatus that couples the computer 9 to a communication network such as the Internet and controls various kinds of communication between the computer 9 and the different electronic apparatus through the communication network. The communication controlling apparatus 907 may be utilized, for example, for distribution of moving image data to a different computer used by the user who views a moving image from the computer 9, transmission of moving image data to a display apparatus installed on the street or in public facilities or the like.

The medium driving apparatus 908 reads out a program or data recorded on a portable storage medium 10 or writes data or the like stored in the auxiliary storage apparatus 903 into the portable storage medium 10. As the medium driving apparatus 908, for example, a reader/writer for a memory card compatible with one or a plurality of standards may be utilized. Where a reader/writer for a memory card is used as the medium driving apparatus 908, as the portable storage medium 10, a memory card (flash memory) of the standard with which the reader/writer for a memory card is compatible may be used, for example, a secure digital (SD) standard. Further, as the portable storage medium 10, a flash memory including a connector, for example, of the USB standard may be used. Furthermore, where the computer 9 incorporates an optical disk drive that may be utilized as the medium driving apparatus 908, various types of optical disks that may be recognized by the optical disk drive may be utilized as the portable storage medium 10. The optical disks that may be utilized as the portable storage medium 10 include, for example, a compact disc (CD), a digital versatile disc (DVD), a Blu-ray disc (Blu-ray is a registered trademark) and so forth. The portable storage medium 10 may be utilized for storage of a program including the processes illustrated in FIGS. 2 and 12, for storage of a program including the process for calculating an optimum route (shift amount) by a dynamic planning method, and for storage of an adjustment method of moving image data and so forth. Meanwhile, the portable storage medium 10 may be utilized, for example, for storage of watermark information, a watermark signal, moving image data, first feature amounts, second feature amounts, finely adjusted moving image data, moving image data in which a watermark signal is embedded and so forth and for storage of a cost and so forth calculated in a dynamic planning method.

If an operator inputs an instruction to start a process for embedding a watermark signal into moving image data to the computer 9 using the inputting apparatus 904 or the like, the processor 901 reads out and executes the digital watermark embedding program stored in a non-transitory recording medium such as the auxiliary storage apparatus 903. The digital watermark embedding program executed by the processor 901 includes the processes at steps S1 to S7 of FIG. 2. For example, the processor 901 generates the watermark signal to be embedded into moving image data based on information to be added to the moving image data. Further, the processor 901 determines a frame of the moving image data at which overlapping of the watermark signal is to be started based on a variation of the value in a time direction of pixels in the region into which a watermark signal is to be embedded in each of a plurality of frames of the moving image data and a feature of the watermark signal. Further, the processor 901 embeds the watermark signal beginning with the determined frame. In this process, the processor 901 functions (acts) as the watermark signal generation unit 110, the first feature amount generation unit 121, the time series signal generation unit 122, the second feature amount generation unit 123, the fine adjustment unit 124, and the watermark signal embedding unit 130 of the digital watermark embedded apparatus 1 of FIG. 1. Further, the RAM of the main storage apparatus 902, the auxiliary storage apparatus 903 and so forth function as the adjustment method holding unit 125 in the digital watermark embedded apparatus 1 of FIG. 1 and besides as a storage unit for storing watermark information, a watermark signal, moving image data, first feature amounts, second feature amounts, finely adjusted moving image data and so forth.

It is to be noted that the computer 9 that acts as the digital watermark embedded apparatus 1 may not include all of the components 901 to 908 depicted in FIG. 21 and it is possible to omit some of the components in accordance with an application or a condition. For example, the computer 9 may be configured omitting the medium driving apparatus 908.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for embedding a digital watermark comprising:
a memory; and
a processor coupled to the memory and configured to:
perform acquisition of a watermark signal and moving image data including a plurality of frames,
perform generation of adjusted moving image data by shifting a region included in each of the plurality of frames based on a characteristic of the watermark signal and a variation in pixel values in a time direction in the region, and
embed the watermark signal into the region in the adjusted moving image data.

2. The apparatus according to claim 1, wherein
the acquisition includes generating the watermark signal by coupling a plurality of types of signal waveforms based on watermark information, and
the shifting includes:
calculating a first correlation value indicative of a correlation between the watermark signal and each of the plurality of types of signal waveforms,
calculating a second correlation value indicative of a correlation between the variation and each of the plurality of types of signal waveforms, and
shifting, based on the first correlation value and the second correlation value, the region included in each of the plurality of frames.

3. The apparatus according to claim 1, wherein
the acquisition includes generating the watermark signal by coupling a plurality of types of signal waveforms based on watermark information, and
the shifting includes:
calculating, for each section corresponding to a time length of the plurality of types of signal waveforms, a first correlation value indicative of a correlation between the watermark signal and each of the plurality of types of signal waveforms,
calculating, for the each section, a second correlation value indicative of a correlation between the variation and each of the plurality of types of signal waveforms,
perform, for the each section, determination of a shift amount in the time direction for shifting the region included in each of the plurality of frames based on the first correlation value and the second correlation value, and
shift, based on the determined shift amount, the region included in each of the plurality of frames.

4. The apparatus according to claim 1, wherein
the processor is configured to determine a specific number based on a frame rate of the moving image data, and
a number of frames of the plurality of frames is not more than the determined specific number.

5. The apparatus according to claim 1, wherein
the moving image data includes the plurality of frames for each period, and
the generation is performed by shifting, for the each period, the region included in each of the plurality of frames.

6. The apparatus according to claim 1, wherein
the variation in the pixel values in the time direction in the region is a variation in an average of the pixel values in the time direction in the region.

7. The apparatus according to claim 1, wherein
the shifting includes shifting the region included in each of the plurality of frames in an anterior direction or a posterior direction of the time direction in the moving image data.

8. The apparatus according to claim 1, wherein
the generation is performed by shifting the region included in each of anther plurality of frames in the moving image data based on based on the characteristic of the watermark signal and another variation in pixel values in the time direction in the region in the other plurality of frames.

9. The apparatus according to claim 8, wherein
the shifting of the region in the other plurality of frames is performed based on a shift amount of the shifting of the region in the plurality of frames.

10. A computer-implemented method for embedding a digital watermark comprising:
acquiring a watermark signal and moving image data including a plurality of frames;
generating adjusted moving image data by shifting a region included in each of the plurality of frames based on a characteristic of the watermark signal and a variation in pixel values in a time direction in the region; and
embedding the watermark signal into the region in the adjusted moving image data.

11. The method according to claim 10, wherein
the variation in the pixel values in the time direction in the region is a variation in an average of the pixel values in the time direction in the region.

12. The method according to claim 10, wherein
the shifting includes shifting the region included in each of the plurality of frames in an anterior direction or a posterior direction of the time direction in the moving image data.

13. The method according to claim 10, wherein
the generating is performed by shifting the region included in each of anther plurality of frames in the moving image data based on based on the characteristic of the watermark signal and another variation in pixel values in the time direction in the region in the other plurality of frames.

14. The method according to claim 13, wherein
the shifting of the region in the other plurality of frames is performed based on a shift amount of the shifting of the region in the plurality of frames.

15. The method according to claim 10, wherein
the moving image data includes the plurality of frames for each period, and
the generating is performed by shifting, for the each period, the region included in each of the plurality of frames.

* * * * *